(12) United States Patent
Asayama

(10) Patent No.: US 9,092,252 B2
(45) Date of Patent: Jul. 28, 2015

(54) INFORMATION PROCESSING APPARATUS, CLIENT MANAGEMENT SYSTEM, AND CLIENT MANAGEMENT METHOD

(75) Inventor: Atsushi Asayama, Kunitachi (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 338 days.

(21) Appl. No.: 13/609,784

(22) Filed: Sep. 11, 2012

(65) Prior Publication Data
US 2013/0227564 A1 Aug. 29, 2013

(30) Foreign Application Priority Data

Feb. 28, 2012 (JP) ................................ 2012-041379

(51) Int. Cl.
G06F 9/455 (2006.01)
G06F 17/30 (2006.01)

(52) U.S. Cl.
CPC ...... *G06F 9/45558* (2013.01); *G06F 17/30165* (2013.01); *G06F 17/30233* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 5,339,427 | A * | 8/1994 | Elko et al. ..................... | 718/103 |
| 7,810,092 | B1 * | 10/2010 | van Rietschote et al. ......... | 718/1 |
| 8,112,392 | B1 * | 2/2012 | Bunnell et al. ................ | 707/625 |
| 8,364,830 | B2 * | 1/2013 | Kimizuka et al. ............ | 709/229 |
| 8,413,210 | B2 * | 4/2013 | Kuzin et al. .................. | 726/2 |
| 2004/0242229 | A1 * | 12/2004 | Okazaki ..................... | 455/432.1 |
| 2006/0112428 | A1 * | 5/2006 | Etelapera ...................... | 726/16 |
| 2007/0260831 | A1 * | 11/2007 | Michael et al. ............... | 711/162 |
| 2008/0051081 | A1 * | 2/2008 | Nelson ...................... | 455/432.3 |
| 2008/0243598 | A1 * | 10/2008 | Abhyanker ................... | 705/12 |

(Continued)

FOREIGN PATENT DOCUMENTS

| | | |
|---|---|---|
| JP | 2000-330954 | 11/2000 |
| JP | 2004-234345 | 8/2004 |

(Continued)

OTHER PUBLICATIONS

Watanabe, Toshikazu, "Does Finally the Era Catch Up? Or No Prevail?" "Is Power of New Thin Client Real? Part 1, Does it have a power to drive out PC from companies this time? The Reason of Restoration, Thin Client." Computer World. Get Technology Right, Japan, IDG Japan, Co. Ltd., May 1, 2005, vol. 2, No. 5, pp. 56-67.

(Continued)

*Primary Examiner* — Camquy Truong
*Assistant Examiner* — Mehran Kamran
(74) *Attorney, Agent, or Firm* — Blakely Sokoloff Taylor & Zafman LLP

(57) ABSTRACT

According to one embodiment, in response to a connection request from a second virtual machine corresponding to a second client terminal on which a first user has newly executed a logon operation, an information processing apparatus determines whether a first user profile associated with a first identifier of the first user is being used by another client terminal. If the first user profile is being used, the apparatus causes a first virtual machine corresponding to the another client terminal to unmount the first storage location, and transmits the information indicative of the path to the first storage location to a second virtual machine corresponding to the second client terminal.

11 Claims, 20 Drawing Sheets

(56) References Cited

U.S. PATENT DOCUMENTS

| | | | |
|---|---|---|---|
| 2009/0132537 A1* | 5/2009 | Denton | 707/9 |
| 2009/0172160 A1* | 7/2009 | Klein | 709/225 |
| 2010/0106826 A1 | 4/2010 | Sugawara | |
| 2011/0153781 A1* | 6/2011 | Srinivas, et al. | 709/219 |
| 2011/0185292 A1* | 7/2011 | Chawla et al. | 715/760 |
| 2011/0185355 A1* | 7/2011 | Chawla et al. | 718/1 |
| 2011/0202977 A1* | 8/2011 | Ohno et al. | 726/4 |
| 2011/0246985 A1* | 10/2011 | Zhou et al. | 718/1 |
| 2012/0054742 A1* | 3/2012 | Eremenko et al. | 718/1 |
| 2012/0151481 A1* | 6/2012 | Kang et al. | 718/1 |
| 2012/0173669 A1* | 7/2012 | Donatelli et al. | 709/217 |
| 2012/0198480 A1* | 8/2012 | Yasaki et al. | 719/319 |
| 2013/0160013 A1* | 6/2013 | Pires et al. | 718/1 |
| 2013/0275974 A1* | 10/2013 | Cao et al. | 718/1 |

FOREIGN PATENT DOCUMENTS

| | | |
|---|---|---|
| JP | 2005056301 | 3/2005 |
| JP | 2010-205047 | 9/2010 |
| WO | WO 2008111448 | 9/2008 |

OTHER PUBLICATIONS

Japanese Patent Application No. 2012-041379, First Office Action, mailed Jul. 15, 2014, (with English Translation).

* cited by examiner

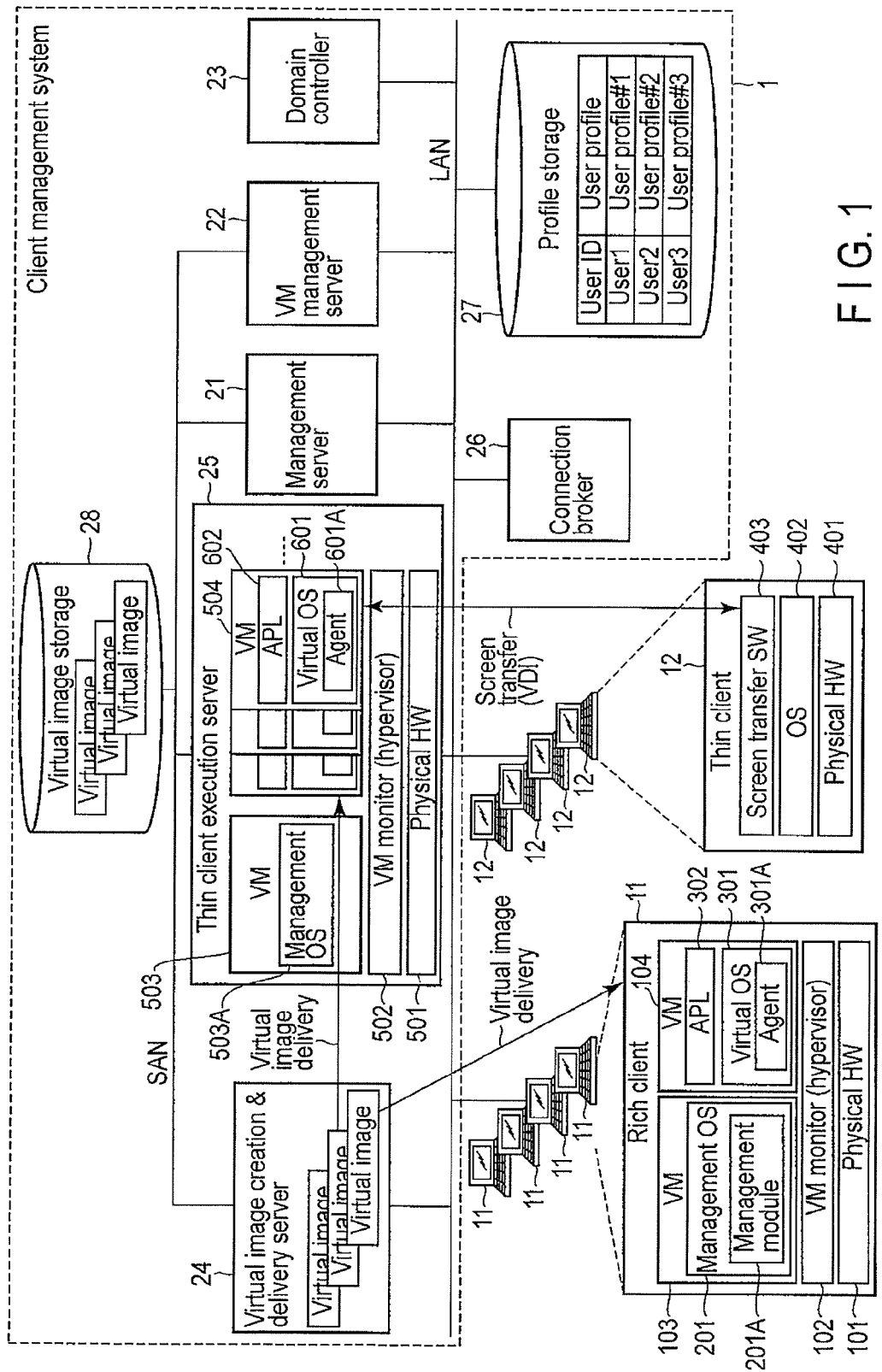
F I G. 1

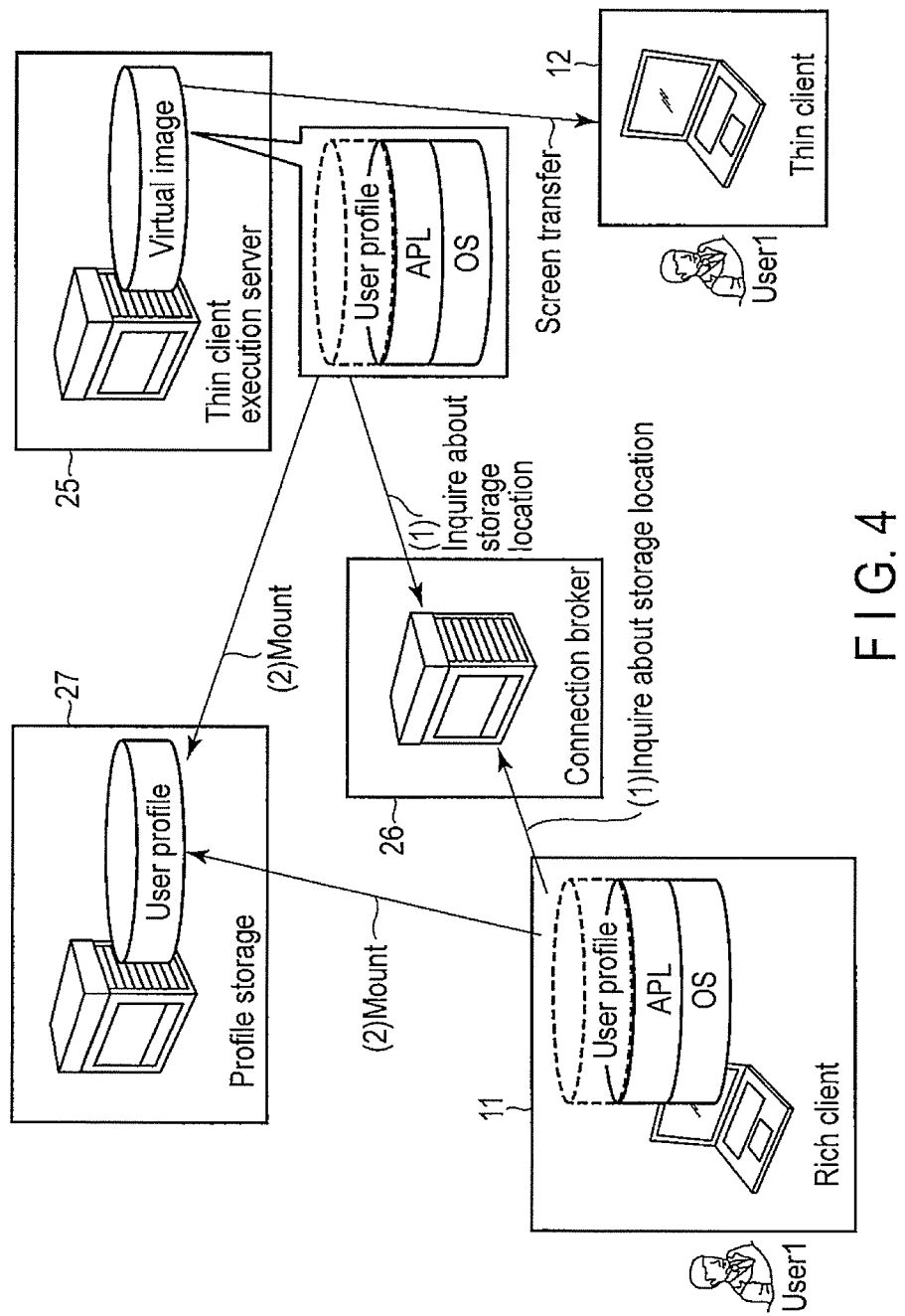
F I G. 4

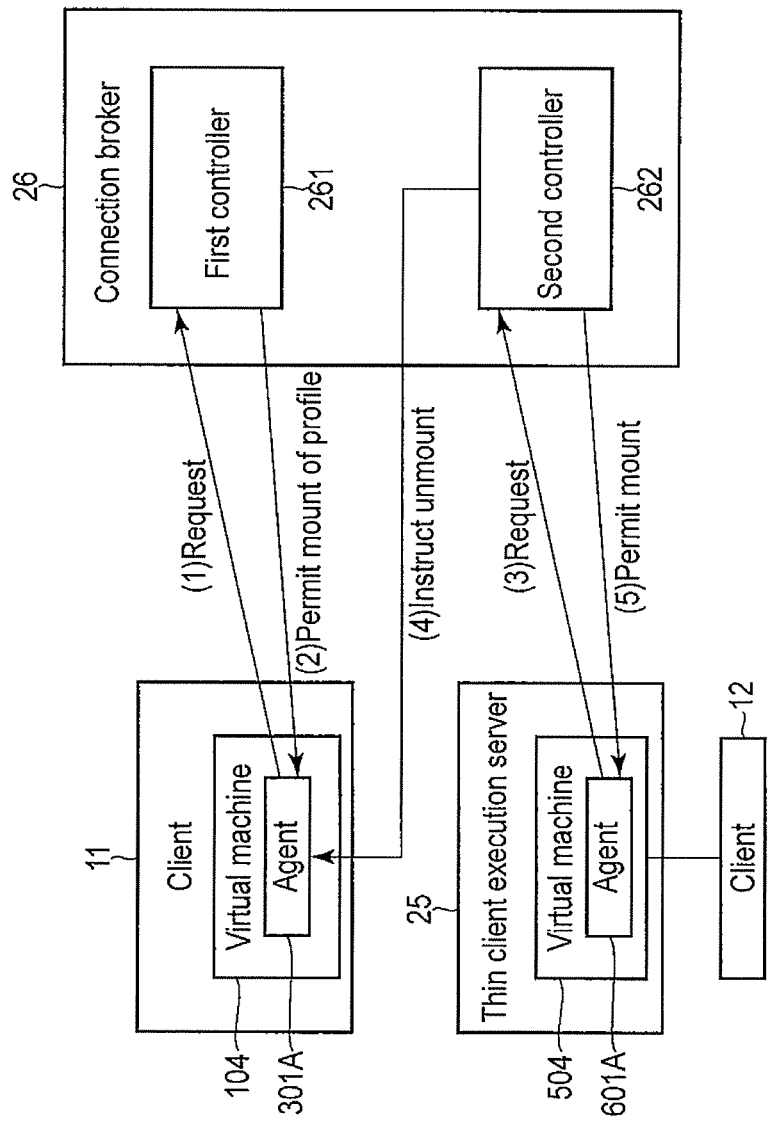
F I G. 5

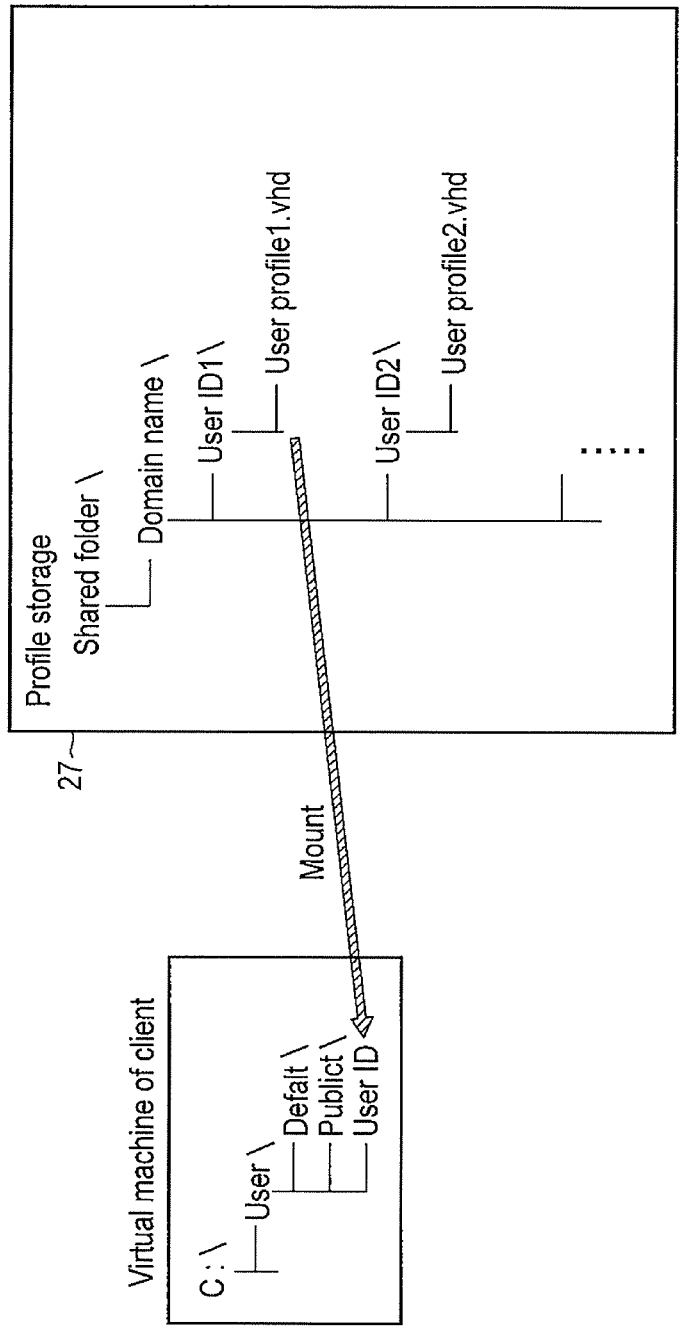
F I G. 6

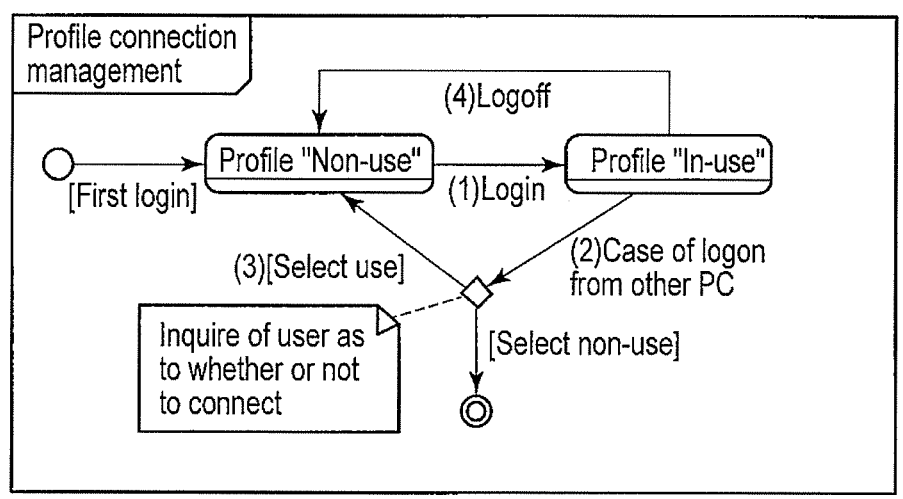
F I G. 7

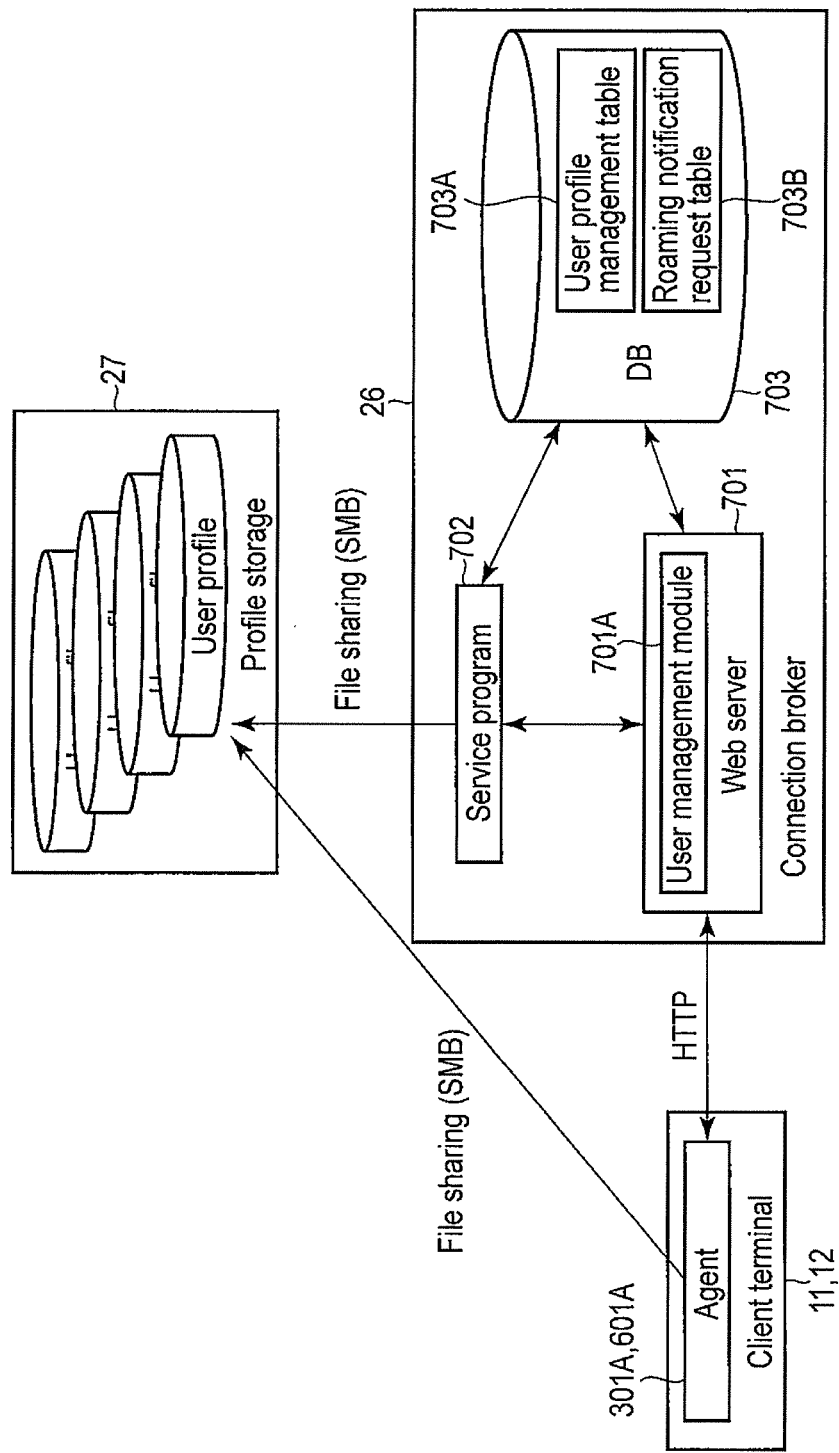
F I G. 8

| Profile ID (Primary key) | User ID | Busy flag | Machine ID | Storage path |
|---|---|---|---|---|
| | | | | |
| | | | | |
| | | | | |
| ⋮ | ⋮ | ⋮ | ⋮ | ⋮ |

| Roaming ID | User ID | Machine ID | Request machine ID |
|---|---|---|---|
| | | | |
| | | | |
| | | | |
| | | | |
| ⋮ | ⋮ | ⋮ | ⋮ |

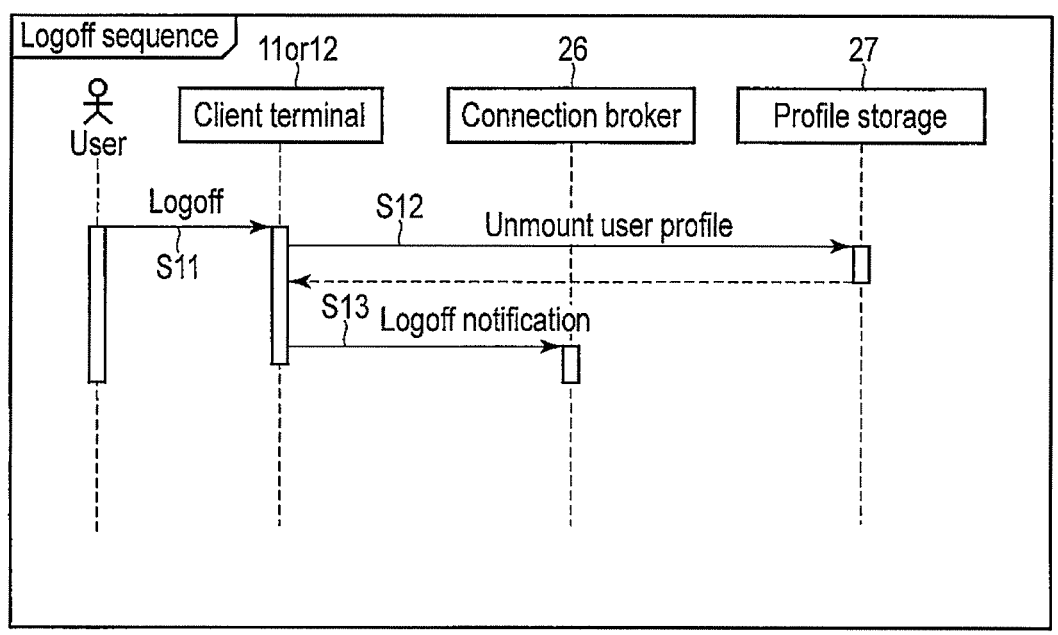
F I G. 12

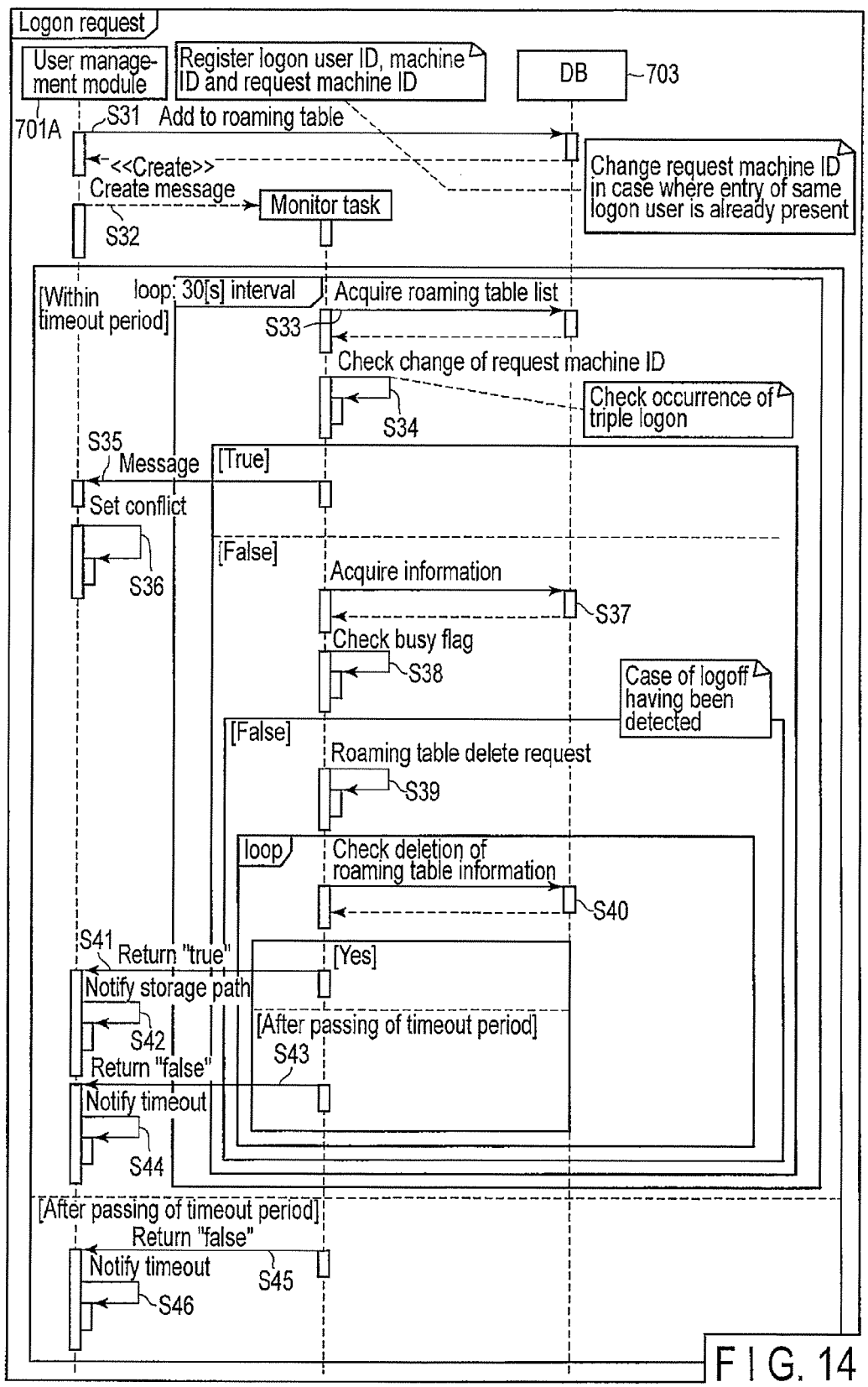
F I G. 14

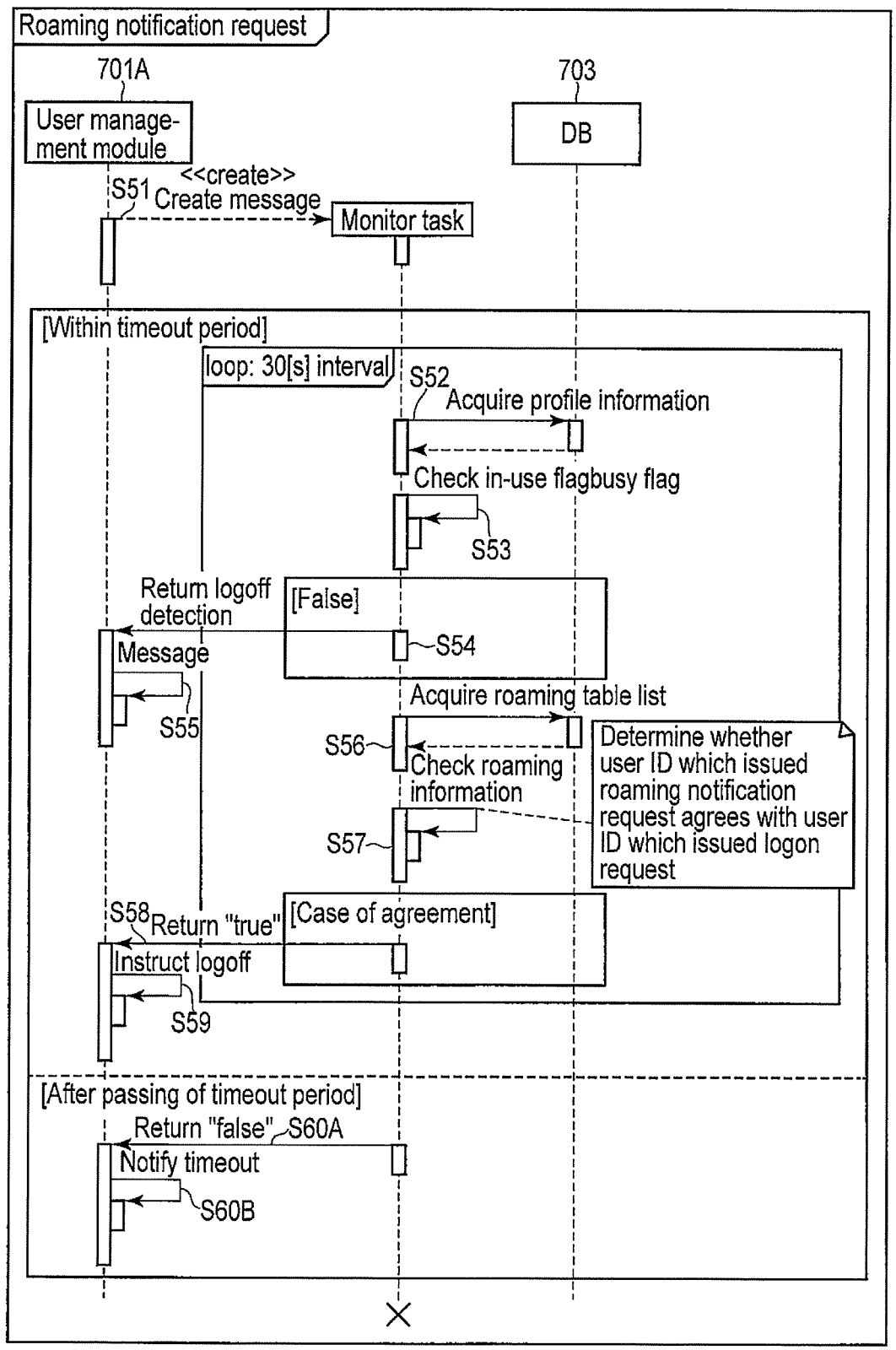
F I G. 15

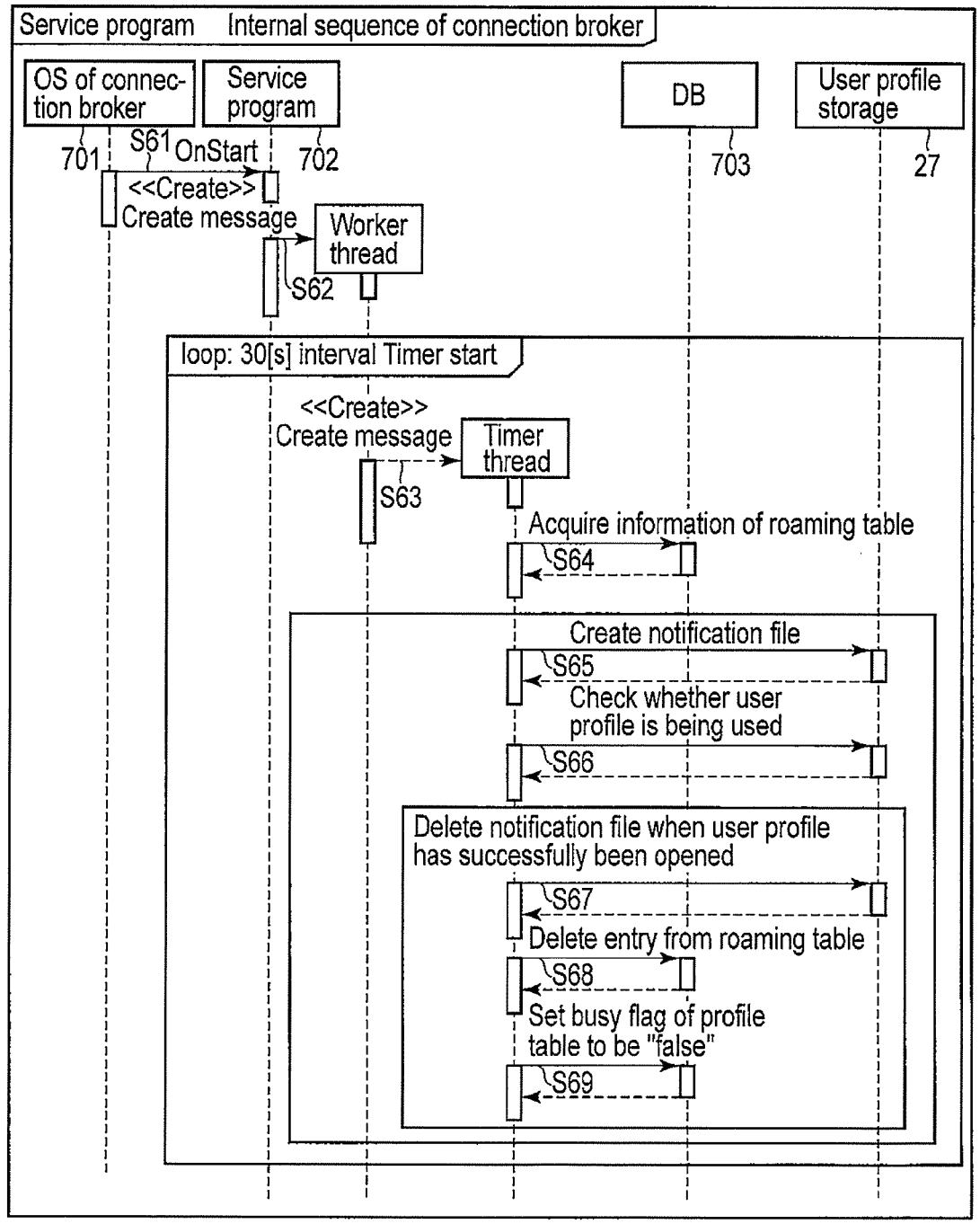
F I G. 16

Scenario patterns at time of double logon

| Pattern | User profile | Connection broker |
|---|---|---|
| Pattern1 | Mount | Connected |
| Pattern2 | Unmount | Connected |
| Pattern3 | Mount | Disconnected |
| Pattern4 | Unmount | Disconnected |

F I G. 17

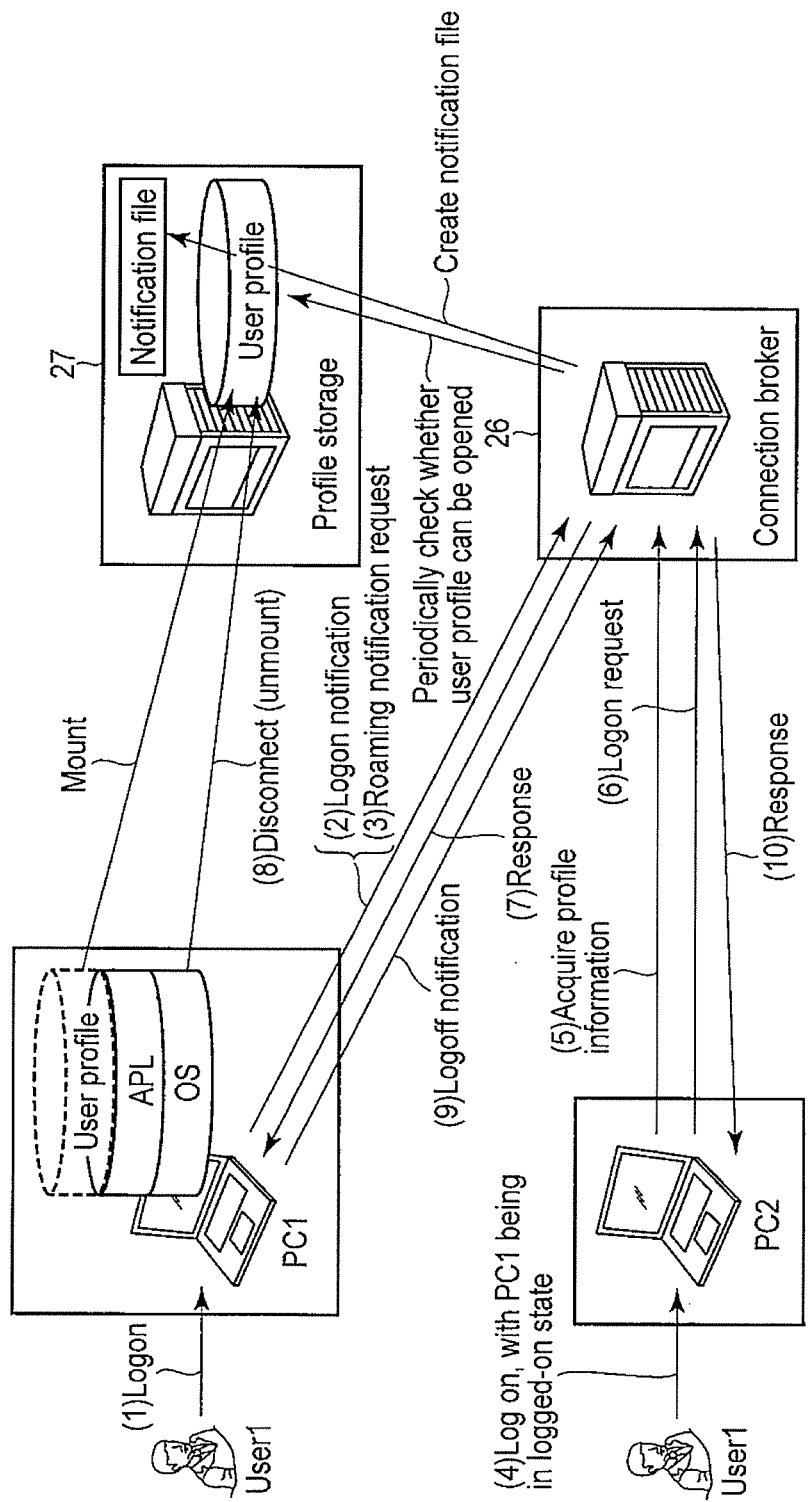
F I G. 18

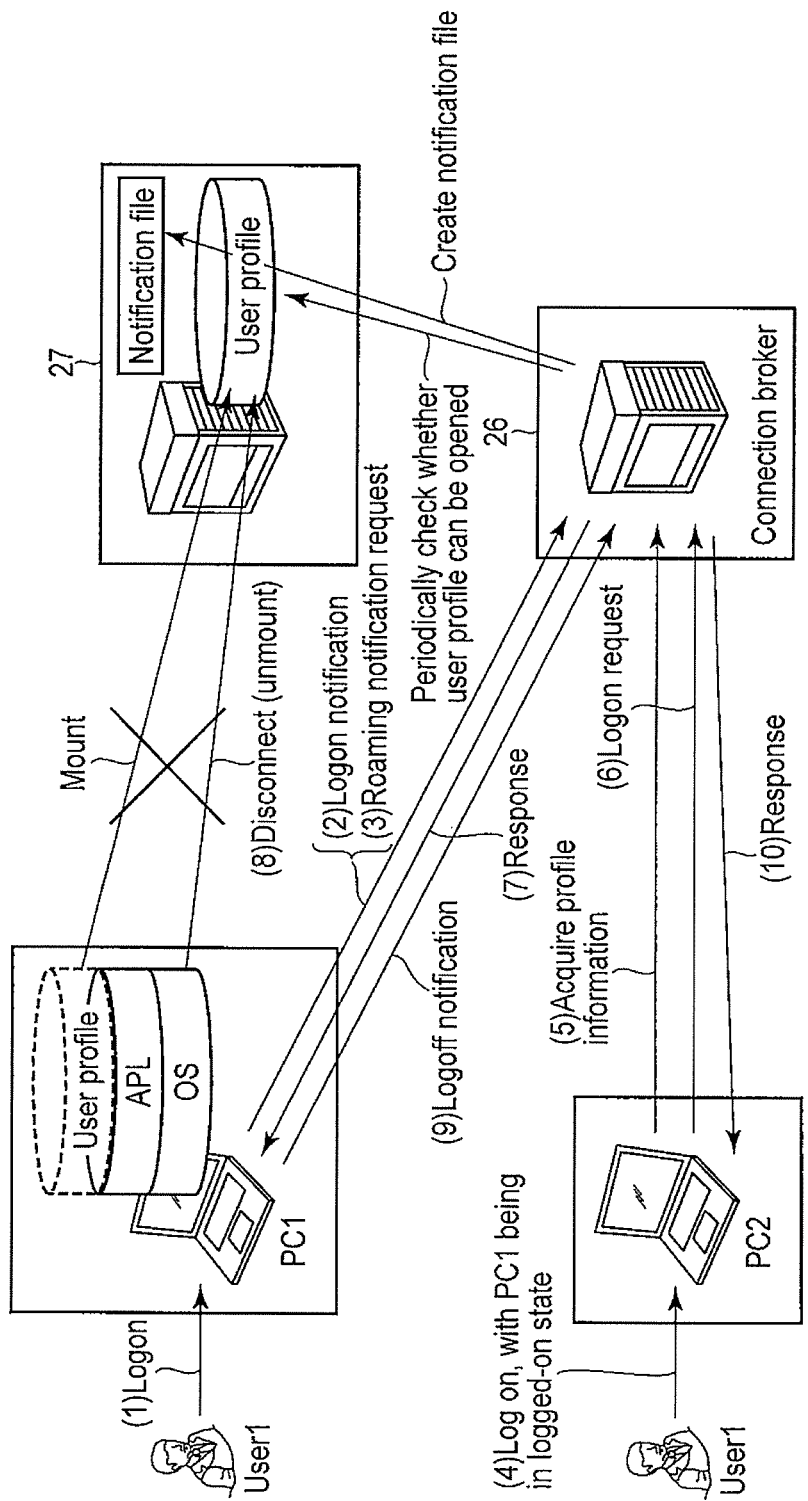
F I G. 19

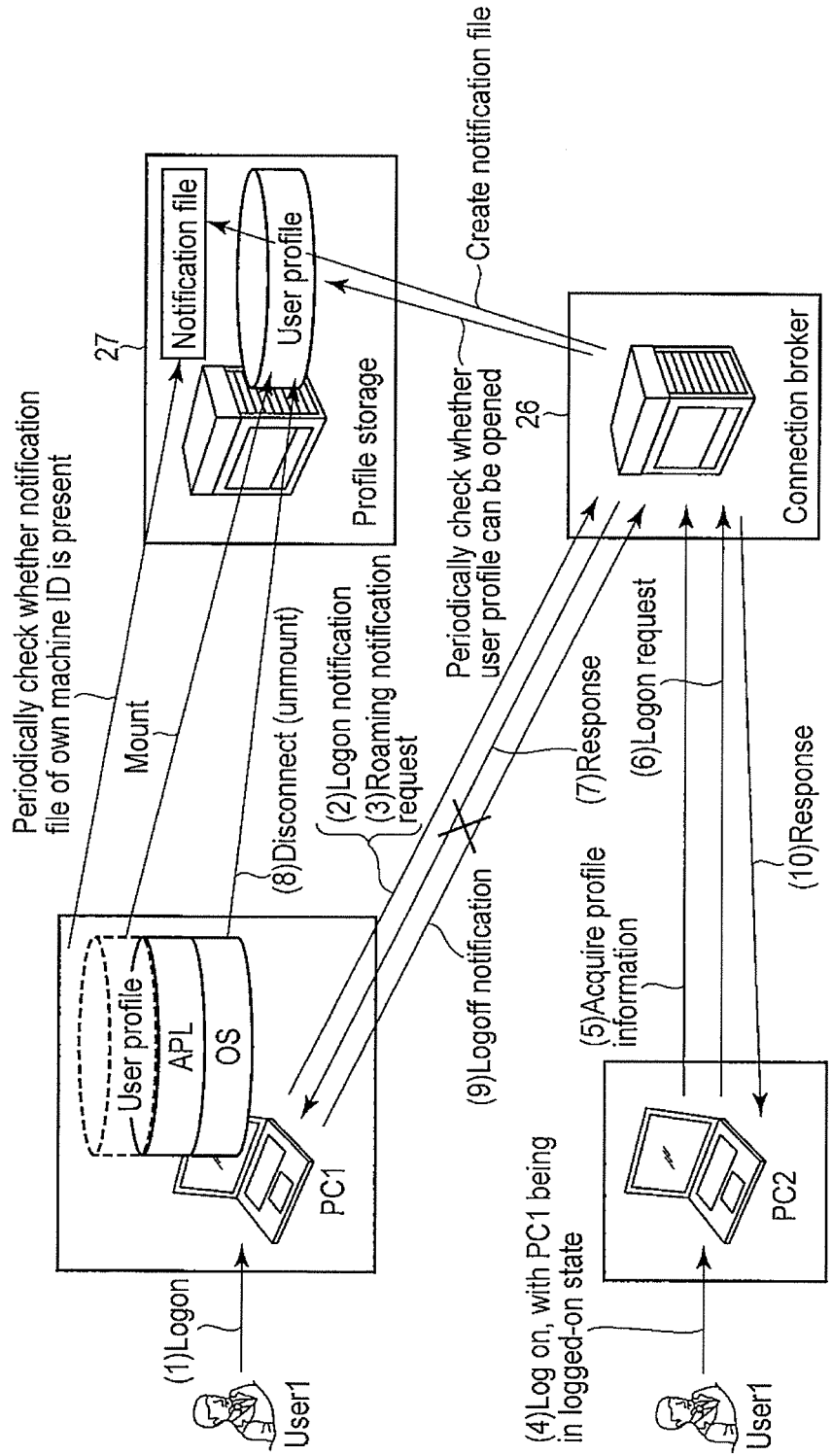
F I G. 20

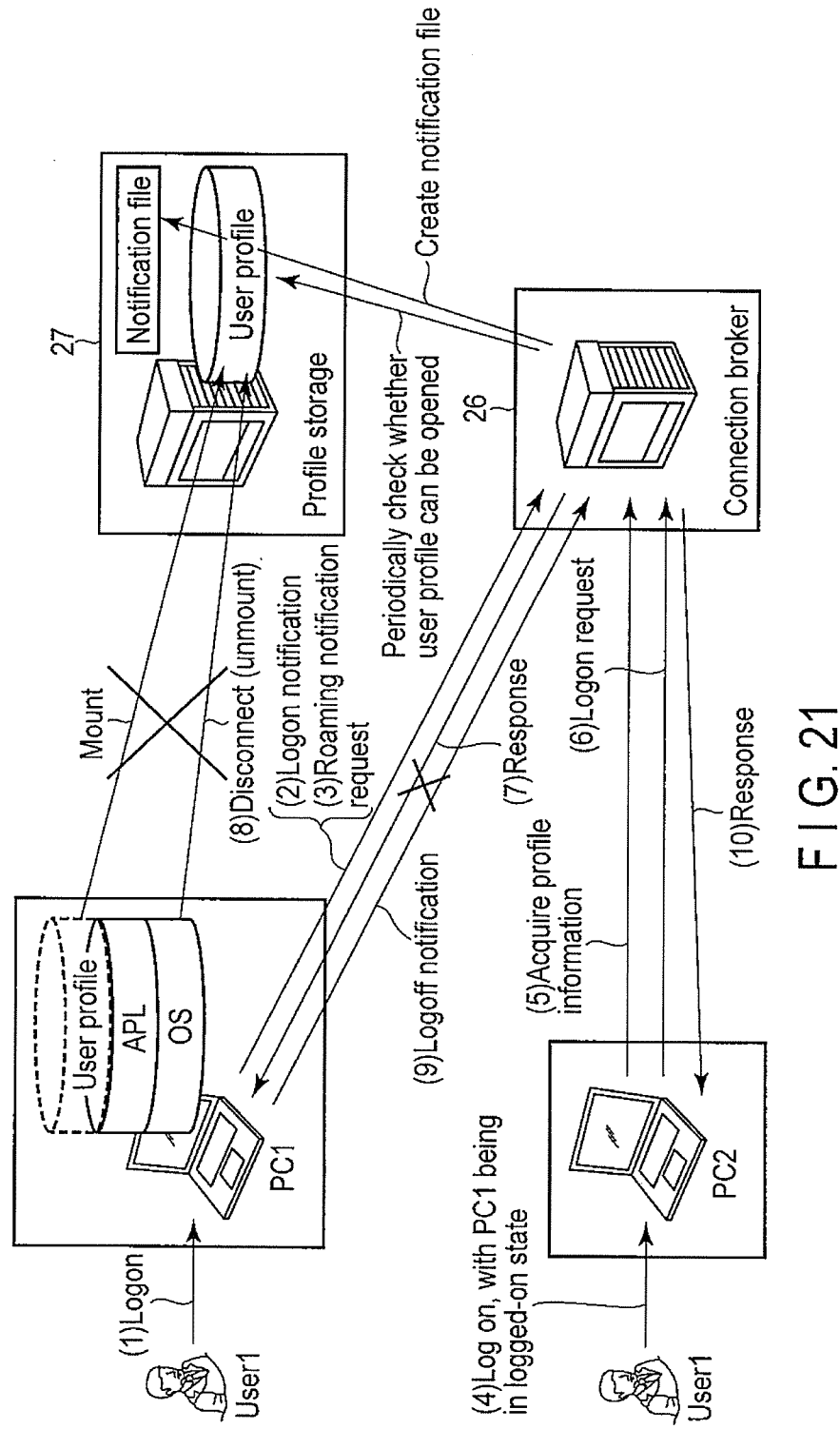
F I G. 21

INFORMATION PROCESSING APPARATUS, CLIENT MANAGEMENT SYSTEM, AND CLIENT MANAGEMENT METHOD

CROSS-REFERENCE TO RELATED APPLICATIONS

This application is based upon and claims the benefit of priority from Japanese Patent Application No. 2012-041379, filed Feb. 28, 2012, the entire contents of which are incorporated herein by reference.

FIELD

Embodiments described herein relate generally to an information processing apparatus for managing a plurality of client terminals, a client management system and a client management method.

BACKGROUND

In recent years, in various kinds of companies, an examination has been made of the introduction of a system (client management system) for managing, by a server, many client terminals in offices.

In the client management system, the desktop environments (operating systems, applications) of many client terminals can be centrally managed by a server in the client management system.

In addition, there have been developed techniques for centrally managing, on a server, user profiles (various setups of applications, user data, etc.) which are used in the respective client terminals.

In recent years, there is a demand that the user can use an arbitrary one of client terminals. Whichever client terminal the user may operate, it would be desirable for the user to use the same user environment (i.e., the same user profile).

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary block diagram illustrating a structure of a client management system including an information processing apparatus according to an embodiment.

FIG. 4 is an exemplary view for explaining a roaming function which is provided by the information processing apparatus (connection broker) according to the embodiment.

FIG. 5 is an exemplary view for explaining a functional configuration of the information processing apparatus (connection broker) according to the embodiment.

FIG. 6 is an exemplary view for explaining user profiles which are managed by the information processing apparatus (connection broker) of the embodiment.

FIG. 7 is an exemplary view for explaining an exclusive control process of a user profile, which is executed by the information processing apparatus (connection broker) of the embodiment.

FIG. 8 is an exemplary block diagram illustrating an internal structure of the information processing apparatus (connection broker) of the embodiment.

FIG. 9 is an exemplary view illustrating the structure of a user profile management table which is used by the information processing apparatus (connection broker) of the embodiment.

FIG. 10 is an exemplary view illustrating the structure of a roaming notification request table which is used by the information processing apparatus (connection broker) of the embodiment.

FIG. 12 is an exemplary view illustrating the procedure of a logoff process for disconnecting the client terminal from the client management system of FIG. 1.

FIG. 14 is an exemplary view illustrating a process procedure in response to a logon request, which is executed by the information processing apparatus (connection broker) of the embodiment.

FIG. 15 is an exemplary view illustrating a process procedure in response to a roaming notification request, which is executed by the information processing apparatus (connection broker) of the embodiment.

FIG. 16 is an exemplary view illustrating the procedure of a process of monitoring a user profile status, which is executed by a service program in the information processing apparatus (connection broker) of the embodiment.

FIG. 17 is an exemplary view for explaining four double-logon scenario patterns, to which a user profile management process of the information processing apparatus (connection broker) of the embodiment is applied.

FIG. 18 is an exemplary view for explaining an operation which is executed by the information processing apparatus (connection broker) of the embodiment in a first double-logon scenario pattern.

FIG. 19 is an exemplary view for explaining an operation which is executed by the information processing apparatus (connection broker) of the embodiment in a second double-logon scenario pattern.

FIG. 20 is an exemplary view for explaining an operation which is executed by the information processing apparatus (connection broker) of the embodiment in a third double-logon scenario pattern.

FIG. 21 is an exemplary view for explaining an operation which is executed by the information processing apparatus (connection broker) of the embodiment in a fourth double-logon scenario pattern.

DETAILED DESCRIPTION

Figure 2:
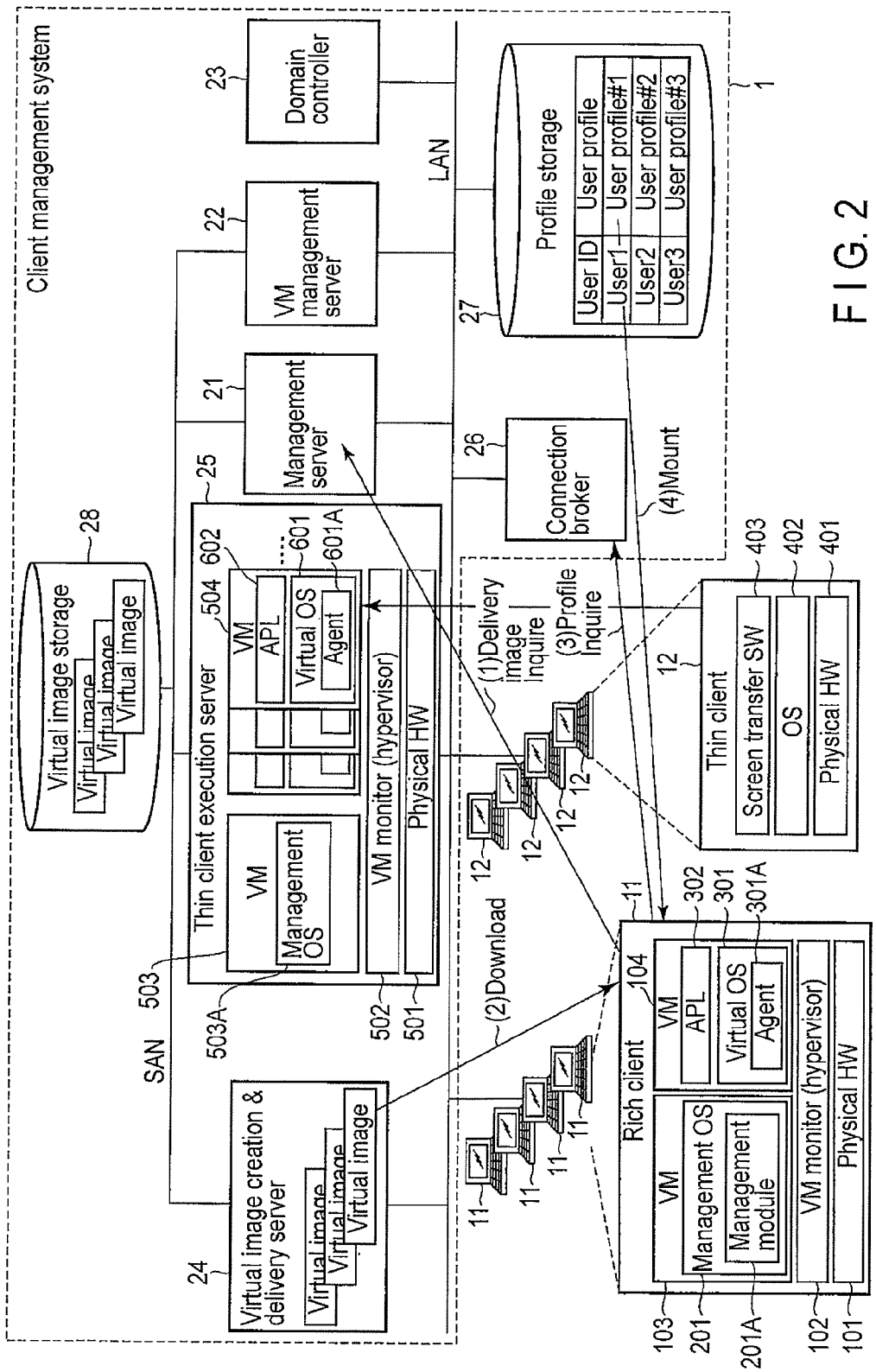
FIG. 2 is an exemplary view for explaining an example of a communication procedure between the client management system of FIG. 1 and a rich client terminal (virtualization client terminal).

Various embodiments will be described hereinafter with reference to the accompanying drawings.

In general, according to one embodiment, an information process apparatus is applied to a client management system configured to manage a plurality of client terminals on a network. The information process apparatus includes a first control module and a second control module.

The first control module is configured to transmit, in response to a connection request from a first virtual machine corresponding to a first client terminal on which a first user has executed a logon operation, information indicative of a path to a first storage location in a storage on the network to the first virtual machine such that the first storage location in the storage is mounted on a file system of the first virtual machine. The first storage location is a storage location which stores a first user profile associated with an identifier of the first user.

The second control module is configured to determine, in response to a connection request from a second virtual machine corresponding to a second client terminal on which the first user has newly executed a logon operation, whether the first user profile is being used by the first client terminal, to cause, if the first user profile is being used, the first virtual machine to unmount the first storage location, and to transmit the information indicative of the path to the first storage location to the second virtual machine such that the first storage location is mounted on a file system of the second virtual machine.

FIG. 1 illustrates a structure of a client management system 1 including an information processing apparatus according to an embodiment. The client management system 1 is a server system for managing a plurality of client terminals. The client management system 1 can be realized by a single or a plurality of servers (physical servers). In the description below, the case is assumed that the client management system 1 is realized by a plurality of servers.

As shown in FIG. 1, the client management system 1 includes a management server 21, a virtual machine management server (VM management server) 22, a domain controller 23, a virtual image creation & delivery server 24, a thin client execution server 25, a connection broker 26, a profile storage 27, and a virtual image storage 28.

The management server 21, virtual machine management server (VM management server) 22, domain controller 23, virtual image creation & delivery server 24, thin client execution server 25, connection broker 26 and profile storage 27 are connected to a network, for example, a LAN. A plurality of clients 11 of a first type and a plurality of clients 12 of a second type are also connected to the above-mentioned network, for example, a LAN.

Further, the management server 21, virtual machine management server (VM management server) 22, virtual image creation & delivery server 24 and thin client execution server 25 are also connected to the virtual image storage 28 via another network such as a storage area network (SAN).

The client management system 1 is disposed, for example, in an office. In the client management system 1, a plurality of client terminals, which are disposed in the office, are centrally managed by the management server 21. In addition, in the client management system 1, a plurality of user profiles, which are applied to the plural client terminals, are stored in the profile storage 27. Each user profile includes setup information for setting up a user environment of the client terminal to which this user profile is applied. The setup information includes, for example, various setup information items relating to each application program, and various setup information items relating to a desktop screen. Besides, each user profile includes user data, such as a document file, which has been created by the user by using an application program.

In the present embodiment, the client management system 1 can manage the client terminals of two types, namely the first type and the second type. The client terminals 11 shown in FIG. 1 are the client terminals of the first type. The client terminal of the first type is a so-called virtualization client terminal. A virtual machine monitor (hypervisor) is installed as virtualization software in a local storage of the client terminal of the first type. The client terminal of the first type executes the virtualization software, and an OS and an application program in a virtual image file which is delivered from the system 1.

Specifically, in the client terminal of the first type (hereinafter referred to as "rich client") 11, a virtual machine monitor (VM monitor) 102 is executed on physical hardware (physical HW) 101 such as a CPU, a memory, a storage and various I/O devices. The virtual machine monitor (VM monitor) 102 is virtualization software such as a hypervisor, and functions as a virtualization layer on the physical hardware (physical HW) 101 by emulating resources of the physical hardware (physical HW) 101. Some virtual machines (VMs) are executed on the virtual machine monitor (VM monitor) 102 that is the virtualization layer. In FIG. 1, the case is assumed that two virtual machines (VMs) 103 and 104 are executed on the virtual machine monitor (VM monitor) 102. The virtual machine (VM) 103 is a virtual machine for executing a management OS (host OS) 201. On the other hand, the virtual machine (VM) 104 executes a virtual OS (guest OS) 301 and an application program (APL) 302 in a virtual image file which is delivered from the system 1. The virtual machine (VM) 104, namely the virtual OS (guest OS) 301 and the application program (APL) 302, operates as a desktop environment of the rich client terminal 11.

The management OS (host OS) 201, in cooperation with the virtual machine monitor (VM monitor) 102, can control the virtual machine (VM) 104. The management OS (host OS) 201 includes a management module 201A. The management module 201A can download a virtual image file from the virtual image creation & delivery server 24 in the system 1. The virtual OS (guest OS) 301 includes an agent 301A. The agent 301A is a program which executes a process of enabling cooperation between the system 1 and rich client terminal 11.

The client terminals of the second type are thin client terminals. These thin client terminals 12 communicate with virtual machines (VMs) 504 which are executed on the thin client execution server 25 in the system 1 by using screen transfer protocols. In other words, these plural thin client terminals 12 are terminals (base terminals) for realizing desktop virtualization by using a virtual desktop infrastructure (VDI). The desktop environment (OS, application) of each of the thin client terminal 12 is centrally managed by the thin client execution server 25 that is a virtualization server. One of the virtual machines (VMs) 504 on the thin client execution server 25 is assigned to each thin client terminal 12. An OS and an application are absent on the thin client terminal 12, and the OS and the application are executed by the virtual machine (VM) 504 on the thin client execution server 25.

Each thin client terminal 12 transmits input information, which corresponds to a user operation of an input device (e.g. keyboard, mouse, etc.), to an associated virtual machine in the thin client execution server 25. In addition, each thin client terminal 12 receives screen information, on which the input information is reflected, from the associated machine in the thin client execution server 25.

Specifically, in the thin client terminal 12, screen transfer software (screen transfer SW) 403 is executed. The screen transfer software (screen transfer SW) 403 is a program which communicates with the virtual machine (VM) in the thin client execution server 25 by using a screen transfer protocol. The screen transfer software (screen transfer SW) 403 may be an application program which operates on the OS. In this case, in the thin client terminal 12, an OS 402 is executed on physical hardware (physical HW) 401 such as a CPU, a memory and various I/O devices, and the screen transfer software (screen transfer SW) 403 is executed on the OS 402.

Next, the respective components of the client management system 1 are described.

The management server 21 is a server for managing the operation of the client management system 1. In accordance with an operation from an administrator terminal (not shown) which is connected to the LAN, the management server 21 can execute management of each user who can use the client management system 1, and management of a virtual image corresponding to each rich client terminal.

The virtual machine management server (VM management server) 22 is a server for managing the thin client execution server 25. The domain controller 23 is a server for authenticating each user and each client terminal. The virtual image creation & delivery server 24 functions as a delivery server for delivering virtual image files, each of which includes an OS and an application program, to the plural rich client terminals 11. The virtual image creation & delivery server 24 can create not only a virtual image file for the rich client terminal 11, but also a virtual image file for the thin client terminal 12. The virtual image file for the rich client terminal 11 is delivered to each rich client terminal 11. On the other hand, the virtual image file for the thin client terminal 12 is delivered to the thin client execution server 25. Each virtual image file is, for instance, a disk image file such as a virtual hard disk (VHD) format.

The thin client execution server 25 is a server which executes a plurality of virtual machines (VMs) for communicating with the plural thin client terminals 12 by using the screen transfer protocol. The thin client execution server 25 may be realized, for example, by a single physical server which is virtualized by a server virtualization technique.

In the thin client execution server 25, a virtual machine monitor (VM monitor) 502 is executed on physical hardware (physical HW) 501 such as a CPU, a memory, a storage and various I/O devices. The virtual machine monitor (VM monitor) 502 is virtualization software such as a hypervisor, and functions as a virtualization layer on the physical hardware (physical HW) 501 by emulating resources of the physical hardware (physical HW) 501. A single virtual machine (VM) 503 for management and a plurality of virtual machines (VMs) 504 for executing virtual desktop environments are executed on the virtual machine monitor (VM monitor) 502. The virtual machine (VM) 503 executes a management OS (host OS) 503A. On the other hand, the virtual machine (VM) 504 executes a virtual OS (guest OS) 601 and an application program (APL) 602 in a virtual image file which is delivered from the virtual image creation & delivery server 24.

The management OS (host OS) 503A, in cooperation with the virtual machine monitor (VM monitor) 502, can control each virtual machine (VM) 504. The virtual OS (guest OS) 601 includes an agent 601A. Like the agent 301A in the virtual machine (VM) 104 of the rich client terminal 11, the agent 601A is a program which executes a process of enabling cooperation between the system 1 and each thin client terminal 12.

The connection broker 26 is the information processing apparatus of the present embodiment, and is applied to the client management system 1 in order to execute, e.g. management of user profiles. The connection broker 26 can be realized by a single physical server.

The connection broker 26 manages a plurality of user profiles by using the profile storage 27 which stores a plurality of user profiles corresponding to a plurality of users. In addition, the connection broker 26 has a function for allocating an available virtual machine on the thin client execution server 25 to the user who has executed a logon operation on the thin client terminal 12. Furthermore, the connection broker 26 has a function (roaming function) for enabling each user to use the same user environment, even when each user has executed a logon operation on any one of the client terminals.

The profile storage 27 stores many user profiles which are associated with identifiers (user IDs) of many users who can use the present system 1. Specifically, the profile storage 27 includes many storage locations for storing user profiles corresponding to many users. When a certain-user has executed a logon operation for connecting ("logon") a certain client terminal to the system 1, a user profile, which is associated with the user ID of this user, is automatically mounted on a file system of the virtual machine corresponding to this client terminal. For example, in the logon process of the rich client terminal 11, the user profile corresponding to the user, who has executed the logon operation, is mounted on a file system of the virtual machine (VM) 104 in the rich client terminal 11. The substance of the user profile (setup information, user data) does not exist in the local storage in the rich client terminal 11, and the substance of the user profile is managed in the system 1. Therefore, the security of the rich client terminal 11 can be enhanced.

On the other hand, in the logon process of the thin client terminal 12, the user profile associated with the user ID of the user, who has executed the logon operation, is automatically mounted on a file system of the virtual machine (VM) 504 in the thin client execution server 25, which corresponds to this thin client terminal 12.

Thereby, each user can use the same user environment (the same user profile) even when each user has logged on to the system 1 by operating either the rich client terminal 11 or the thin client terminal 12.

The virtual image storage 28 is a storage for storing virtual image files which have been created by the virtual image creation & delivery server 24. Incidentally, each of the profile storage 27 and virtual image storage 28 may be realized by a storage in a file server (not shown) in the system 1.

Next, referring to FIG. 2, an operation sequence of the rich client terminal 11 is described.

(1) The management module 201A or agent 301A in the rich client terminal 11 inquires of the management server 21 as to whether there is a delivery image (virtual image file) which is to be applied to the rich client terminal 11. For example, when there is no virtual image file in the local storage of the rich client terminal 11, or when an updated virtual image file, which corresponds to a virtual image file that has already been delivered to the rich client terminal 11, is present in the system 1, the management server 21 notifies the management module 201A or agent 301A of the identifier of the virtual image file that is to be downloaded.

(2) The management module 201A or agent 301A makes a request to the virtual image creation & delivery server 24 for the virtual image file having the notified identifier, and downloads this virtual image file from the virtual image creation & delivery server 24. When the rich client terminal 11 is re-booted, the OS (virtual OS) 301 in the downloaded virtual image file is started.

(3) A logon screen is displayed by the virtual OS 301. The user executes a logon operation on the logon screen. The virtual OS 301, in cooperation with the domain controller 23, executes user authentication. If user authentication is successfully executed, the virtual machine (VM) 104 (e.g., agent 301A) transmits a connection request to the connection broker 26, and inquires of the connection broker 26 about the storage location of the user profile corresponding to the user who has executed the logon operation. The connection request is a request for connecting ("logon") the rich client terminal 11 to the system 11, and includes the user account (user ID) of the user who has executed the logon operation. The user ID is an identifier for uniquely identifying the user. The connection broker 26 transmits to the virtual machine (VM) 104 (e.g., agent 301A) information indicative of a path, i.e. a storage path, to a storage location (first storage location) in the profile storage 27. The first storage location is a storage location for storing a user profile associated with the user ID of the user.

(4) The virtual machine (VM) 104 (e.g., agent 301A) mounts the above-described user profile in the profile storage 27, i.e. the above-described first storage location, on the file system of the virtual machine (VM) 104 (the file system of the virtual OS 301). From this time on, the virtual machine (VM) 104 accesses not the local storage of the rich client terminal 11, but the first storage location in the profile storage 27, in order to read or write the user profile.

Figure 3:
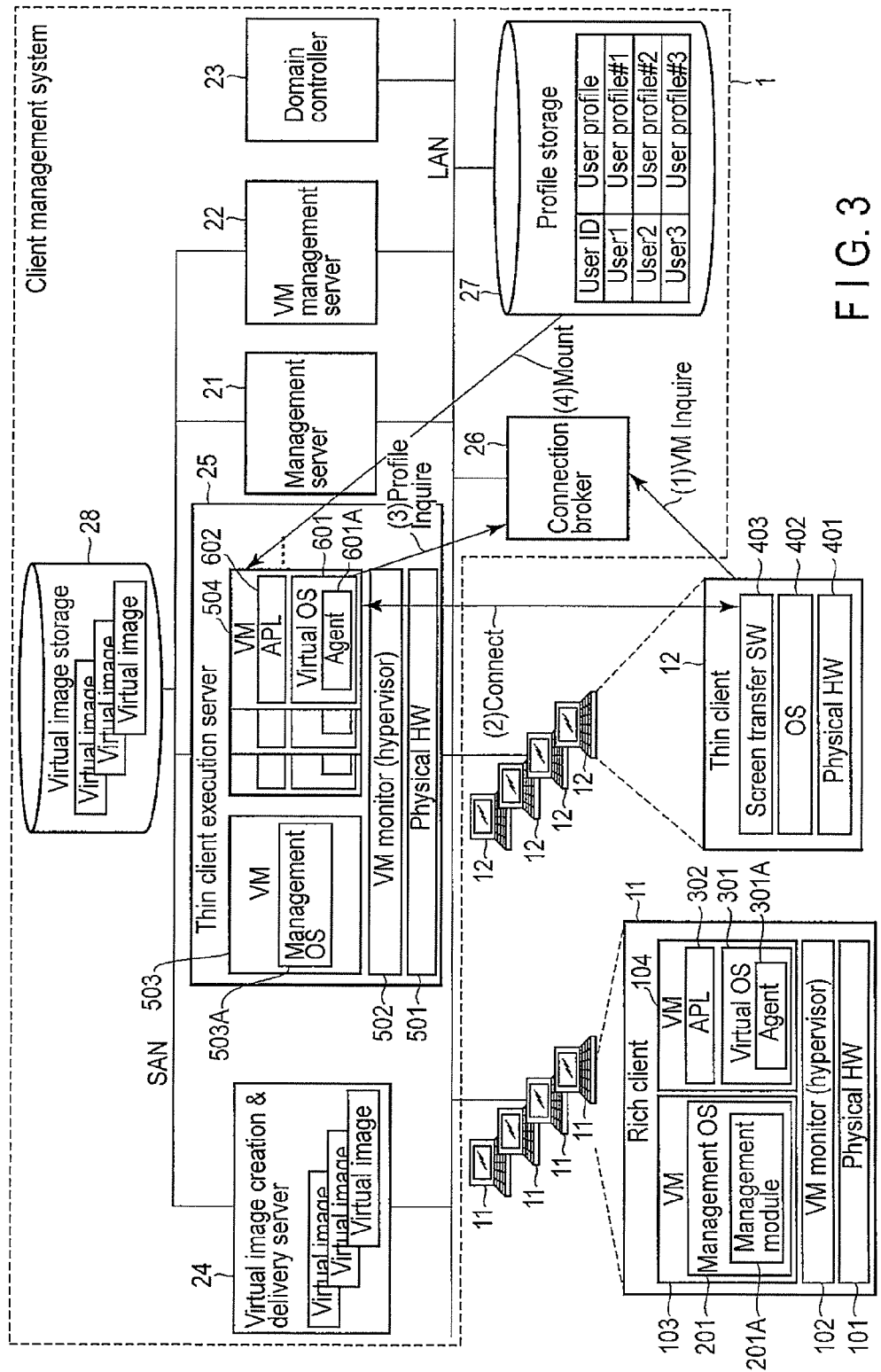
FIG. 3 is an exemplary view for explaining an example of a communication procedure between the client management system of FIG. 1 and a thin client terminal.

Next, referring to FIG. 3, an operation sequence of the thin client terminal 12 is described.

(1) The OS 402 or screen transfer software 403 of the thin client 12 inquires of the connection broker 26 about a usable virtual machine. The connection broker 26 sends to the thin client terminal 12 virtual machine information. The virtual machine information is information designating a virtual machine on the thin client execution server 25, which can be used by the thin client terminal 12. In this case, the connection broker 26 may send to the thin client terminal 12 a list of virtual machines on the thin client execution server 25, which can be used by the thin client terminal 12. For example, based on a user ID included in the inquiry, the connection broker 26 can send to the thin client terminal 12 a screen for displaying a list of virtual machines which can execute a desktop environment corresponding to the user and are not currently used. The user may select a virtual machine from the list of virtual machines.

(2) The OS 402 or screen transfer software 403 establishes a connection to a certain virtual machine (VM) 504 designated by the connection broker 26, or to a certain virtual machine (VM) 504 selected from the list of virtual machines, and activates the connected virtual machine (VM) 504. Then, the virtual OS 601 in the virtual machine (VM) 504 is started.

(3) A logon screen is displayed by the virtual OS 601. The user performs a logon operation on the logon screen. The virtual OS 601 executes user authentication in cooperation with the domain controller 23. If the user authentication is successfully carried out, the virtual machine 504 (e.g., agent 601A) transmits a connection request to the connection broker 26, and inquires of the connection broker 26 about the storage location of the user profile corresponding to the user who executed the logon operation. The connection request is a request for connecting ("logon") the thin client terminal 12 to the system 11, and includes a user account (user ID) of the user who executed the logon operation. The connection broker 26 notifies the virtual machine (VM) 504 (agent 601A) of information indicative of a path, i.e. a storage path, to a storage location in the profile storage 27. The storage location is a storage location for storing the user profile associated with the user ID of the user.

(4) The virtual machine (VM) 504 (e.g., agent 601A) automatically mounts the above-described user profile in the profile storage 27 on the file system of the virtual machine 504 (the file system of the virtual OS 601). From this time on, the virtual machine (VM) 504 accesses not the local storage of the thin client execution server 25, but the storage location in the profile storage 27, in order to read or write the user profile.

Next, referring to FIG. 4, a description is given of a roaming function which is executed by the connection broker 26.

The roaming function is a function for enabling each user to use the same user environment corresponding to this user, even when each user uses any one of the rich client terminals 11 or any one of the thin client terminals 12.

The case is now assumed that a rich client terminal 11 is disposed on the desk of each user, and thin client terminals 12 are disposed in a meeting room or a public space. Each user can log on to the client management system 1 by operating the rich client terminal 11 on his/her own desk. When the user has moved to the meeting room or public space, the user can log on to the client management system 1 by operating a thin client terminal 12. In this case, even when the user uses any one of the client terminals 12, the roaming function provides the same user profile to the virtual machine corresponding to the client terminal 12.

A description is given of a process which is executed by the connection broker 26 when the logon operation has been executed on the rich client terminal 11.

(1) The user (user1) executes a logon operation for connecting the rich client terminal 11 on his/her own desk to the system 1. The virtual machine (VM) 104 of the rich client terminal 11, for example, the agent 301A, transmits a connection request to the connection broker 26, and inquires of the connection broker 26 about the storage location of a user profile corresponding to the user (user1) who has executed the logon operation.

(2) The connection broker 26 transmits a storage path of the user profile of the user (user1) to the virtual machine (VM) 104 of the rich client terminal 11. The virtual machine (VM) 104 mounts the user profile of the user (user1) on the file system of the virtual machine (VM) 104. The file system of the virtual machine (VM) 104 is a file system which is managed by the virtual OS 301 in the virtual machine (VM) 104. The virtual OS 301 reads the user profile mounted on the file system from the profile storage 27, and is able to execute, e.g. setup of an application program and setup of a desktop environment, based on the setup information in the user profile. In addition, user data, such as various documents, are present in the user profile. The virtual OS 301 reads from the profile storage 27 the user data in the user profile which is mounted on the file system, and can display the user data on the display of the rich client terminal 11. Moreover, the updated user data or setup information, for example, is stored not in the local storage of the rich client terminal 11, but in the profile storage 27.

Next, a description is given of a process which is executed by the connection broker 26 when the logon operation has been executed on the thin client terminal 12.

(1) The user (user1) executes a logon operation for connecting the thin client terminal 12, which is disposed in, for example, a public space, to the system 1. The virtual machine (VM) 504 on the thin client execution server 45, for example, the agent 601A, which corresponds to the thin client terminal 12, transmits a connection request to the connection broker 26, and inquires of the connection broker 26 about the storage location of a user profile corresponding to the user (user1) who has executed the logon operation.

(2) The connection broker 26 transmits a storage path of the user profile of the user (user1) to the virtual machine (VM) 504 on the thin client execution server 25, which corresponds to the thin client terminal 12. The virtual machine (VM) 504 mounts the user profile of the user (user1) on the file system of the virtual machine (VM) 504. The file system of the virtual machine (VM) 504 is a file system which is managed by the virtual OS 601 in the virtual machine (VM) 504. The virtual OS 601 can execute, e.g. setup of an application program and setup of a desktop environment, based on the setup information in the user profile mounted on the file system.

As has been described above, each user can use the same user environment, even when the user executes the logon operation on any one of the client terminals.

However, while a certain client terminal logs on to the system 1 and uses the user profile on the profile storage 27, this user profile cannot be used from other client terminals. Thus, after a certain-user has once logged on to the system 1 by using a certain client terminal, this user cannot log on to the system 1 by using another client terminal, unless the user executes a logoff operation or a shutdown operation on the client terminal.

There is a case where the user moves to the meeting room or public space in the state in which the user logs on to the system 1 by using the client terminal on his/her desk, for example, the rich client terminal 11. There is a case where this user desires to long on to the system 1 by using a client terminal disposed in the meeting room or public space, for example, the thin client terminal 12, in order to view his/her own user data such as document files. However, since the rich client terminal 11 on the desk of the user is in the state in which the rich client terminal 11 logs on to the system 1, the user profile of this user is being used by the rich client terminal 11. Thus, the user cannot normally log on to the system 1 by using the thin client terminal 12 on which the user has newly executed the logon operation.

In the present embodiment, when the connection broker 26 has received a connection request from a client terminal, the connection broker 26 determines whether the user profile of the user, who has executed the logon operation on this client terminal, is being used by another client terminal. If the user profile is being used, the connection broker 26 automatically executes a process of causing the virtual machine corresponding to the client terminal, which is currently using the user profile, to unmount this user profile. In other words, the connection broker 26 causes the client terminal, which is using the user profile, to be automatically logged off from the system 1. Thereby, even when the user has moved to the meeting room or public space in the state in which the user logs on to the system 1 by using the client terminal on his/her desk, the user can log on to the system 1 by using the client terminal in the meeting room or public space. Furthermore, the user can use the same user environment as with the client terminal on his/her own desk, even with the client terminal in the meeting room or public space.

FIG. 5 illustrates the functional configuration of the connection broker 26. The connection broker 26 includes a first controller 261 and a second controller 262.

(1) The first controller 261 receives a request (connection request) from the agent 601A in the virtual machine (VM) 104 which corresponds to the client terminal 11 on which the user (first user) has executed a logon operation.

(2) The first controller 261 transmits information indicative of a path to a first storage location to the agent 601A in the virtual machine (VM) 104, so that the storage location (first storage location) in the profile storage 27, which stores a first user profile associated with the user ID of the first user, may be mounted on the file system of the virtual machine (VM) 104.

Each user profile in the profile storage 27 may be a virtual image file such as a virtual hard disk (VHD) format. In this case, the virtual image file of the user profile is mounted at a predetermined mount point on the file system of the virtual machine (VM) 104. For example, a predetermined directory (user profile directory) in the file system for storing the user profile is used as the above-described mount point. This is illustrated in FIG. 6. As shown in FIG. 6, in the profile storage 27, there are folders (user ID1\, user ID2\, . . . ) corresponding to a plurality of user IDs (user ID1, user ID2, . . . ). In these folders (user ID1\, user ID2\, . . . ), user profiles (UserProfile1.VHD, UserProfile2.HVD, . . . ), which are associated with the user IDs (user ID1, user are stored. UserProfile1.VHD is mounted at the user profile directory (user ID1) on the file system of the virtual machine (VM) 104.

(3) The second controller 262 receives a connection request from a virtual machine corresponding to a client terminal on which the first user has newly executed a logon operation, for example, from the agent 601A in the virtual machine (VM) 504 which corresponds to the client terminal 12. The second controller 262 determines whether the above-described first user profile, which is associated with the user ID of the first user, is being used by another client terminal (the client terminal 11 in this example).

(4) The first user profile is being used by the client terminal 11. Thus, the second controller 262 instructs the virtual machine (VM) 104 corresponding to the client terminal 11 to unmount the first user profile, that is, the above-described first storage location in the profile storage 27, and causes the virtual machine (VM) 104 to unmount the first user profile. In order to cause the virtual machine (VM) 104 to unmount the first user profile, the second controller 262 may instruct the virtual machine (VM) 104 to execute a logoff process for disconnecting the client terminal 11 from the system 1.

(5) If the first user profile has been unmounted, the second controller 262 transmits information indicative of a path to the first storage location to the agent 601A in the virtual machine (VM) 504, so that the first user profile may be mounted on the file system of the virtual machine (VM) 504, or in other words, so that the first storage location in the profile storage 27 for storing the first user profile may be mounted on the file system of the virtual machine (VM) 504.

The above description has been given of the case where a certain-user moves to the thin client terminal 12 in the state in which the user logs on to the system 1 by using the rich client terminal 11, and logon to the system 1 is newly requested by using the thin client terminal 12, or in other words, the case where the client terminal at the starting point of movement is the rich client terminal 11 and the client terminal at the destination of movement is the thin client terminal 12. However, the client terminal at the starting point of movement may be the thin client terminal 12 and the client terminal at the destination of movement may be the rich client terminal 11. In addition, both the client terminal at the starting point of movement and the client terminal at the destination of movement may be the same kind of client terminals.

By the above-described process of the connection broker 26, the user can change the client terminal that is used, from a certain rich client terminal to another rich client terminal, or from a certain rich client terminal to a thin client terminal, or from a certain thin client terminal to another thin client terminal, and moreover the user can use the same user environment with the client terminal at the starting point of movement and with the client terminal at the destination of movement, without executing an operation for disconnecting the client terminal at the starting point of movement from the system 1.

When the first user profile is being used by another client terminal, the second controller 262 may cause the virtual machine (VM) 504, which corresponds to the client terminal 12 that has transmitted the connection request, to display on the display of the client terminal 12 a screen (confirmation screen) for confirming whether or not to connect the client terminal 12 to the system 1. This screen may display a message indicating that the client terminal 11 has already been logged on, or a message indicating that the client terminal 11 is logged off if connection is selected. If the user selects connection (forcible connection) on the screen, the agent 601A of the virtual machine (VM) 504 corresponding to the client terminal 12 transmits to the connection broker 26 a request (logon request) indicating the execution of connection. When this logon request has been received, the second controller 262 causes the virtual machine (VM) 104 to unmount the first user profile.

If the user has not selected the connection (forcible connection), the logon process of the client terminal 12 is terminated. The client terminal 11 keeps the logon state. Thus, since the logon process of the client terminal, which has newly executed the logon operation, can be halted where necessary, the client terminal that is used by the user can safely be changed.

Next, referring to FIG. 7, a description is given of a user profile exclusive control process which is executed by the connection broker 26.

FIG. 7 illustrates a status transition of a user profile. The connection broker 26 executes management as to whether each user profile is being used or not, by using a database (DB). When the user has first executed a logon operation, a status "non-use (false)" of a user profile, which is associated with the user ID of the user, is registered in the DB in the connection broker 26. The agent of the virtual machine corresponding to the client terminal (first client terminal), on which the user has executed a logon operation, creates a user profile at a storage location on the profile storage 27, which has been designated by the connection broker 26. Then, the agent mounts this user profile, and thereby the first client terminal can log on to the system 1. If the first client terminal has logged on to the system 1, the agent of the virtual machine corresponding to the first client terminal transmits logon notification to the connection broker 26. When the logon notification has been received, the connection broker 26 sets the above-described status of the user profile to be "in-use (true)".

When a logoff operation has been executed by the user on the first client terminal, the agent of the virtual machine corresponding to the first client terminal transmits logoff notification to the connection broker 26. When the logoff notification has been received, the connection broker 26 sets the status of the user profile to be "non-use (false)".

If the user has executed a logon operation on another client terminal (second client terminal) in the state in which this user logs on to the system 1 by using the first client terminal, the agent of the virtual machine corresponding to the second client terminal transmits a connection request to the connection broker 26 in order to inquire about the storage location of the user profile. The connection broker 26 executes the process for displaying the above-described confirmation screen on the second client terminal. This confirmation screen displays a message such as "Is logon to be executed, though other client is now being logged on?". If "Yes" is selected by the user, the agent of the virtual machine corresponding to the second client terminal transmits a logon request (forcible connection request) to the connection broker 26. Responding to the reception of the logon request, the connection broker 26 causes the virtual machine corresponding to the first client terminal to unmount the user profile.

If the user profile has been unmounted, the connection broker 26 sets the status of the user profile to be "non-use (false)". After the status of the user profile has been set to be "non-use (false)", the connection broker 26 returns information indicative of the path to the user profile to the agent which has transmitted the logon request. If the virtual machine corresponding to the second client terminal has mounted the user profile in the profile storage 27 and has logged on to the system 1, the agent of the virtual machine corresponding to the second client terminal transmits logon notification to the connection broker 26. When the logon notification has been received, the connection broker 26 sets the above-described status of the user profile to be "in-use (true)".

Next, referring to FIG. 8, the internal structure of the connection broker 26 is described.

Communication between the agent 301A or 601A in each client terminal and the connection broker 26 is executed by using a protocol such as HTTP. On the other hand, communication between the agent 301A or 601A and the profile storage 27 is executed by using a protocol for file sharing, such as SMB (Server Message Block).

The connection broker 26 includes a Web server 701, a service program 702 and a database (DB) 703. The Web server 701 is software for communicating with the agent of each client terminal, and includes a user management module 701A. The user management module 701A executes the function of the above-described first controller 261. Further, the user management module 701A executes the function of the above-described second controller 262 in cooperation with the service program 702.

The database (DB) 703 includes a user profile management table 703A and a roaming notification request table 703B. The user management module 701A executes a process of managing the status of use of each user profile by using the database (DB) 703, and a process of notifying the agent 301A or 601A of the storage path of the user profile. The service program 702 executes a process for checking whether the individual user profile in the profile storage 27 has been unmounted.

As shown in FIG. 9, the user profile management table 703A includes a plurality of entries corresponding to a plurality of user profiles. Each entry stores a profile ID, a user ID, a busy flag, a machine ID, and a storage path. The profile ID is a primary key for uniquely identifying the user profile. The user ID is indicative of an identifier of a user who has requested a connection to the system 1. The busy flag indicates whether the user profile associated with the user ID is being used or not. The busy flag is set to be either "true" or "false". The busy flag=true indicates that the user profile is being used. The busy flag=false indicates that the user profile is not being used. The machine ID is an identifier of a client terminal which is currently being used by a user having the user ID in the same entry as this machine ID. The storage path is indicative of the storage location of the user profile which is associated with this user ID.

As shown in FIG. 10, each of the entries of the roaming notification request table 703B stores a roaming ID, a user ID, a machine ID and a request machine ID. The roaming ID is a primary key for uniquely identifying a logon request (forcible connection request). The user ID is an identifier of a user who has transmitted the logon request (forcible connection request), that is, a logon user ID. The machine ID is an identifier of a client terminal which is currently using the user profile. The request machine ID is an identifier of a client terminal which has transmitted the logon request (forcible connection request).

Next, using sequence charts of FIG. 11 to FIG. 16, a series of operations of the connection broker 26 is described.

Figure 11:
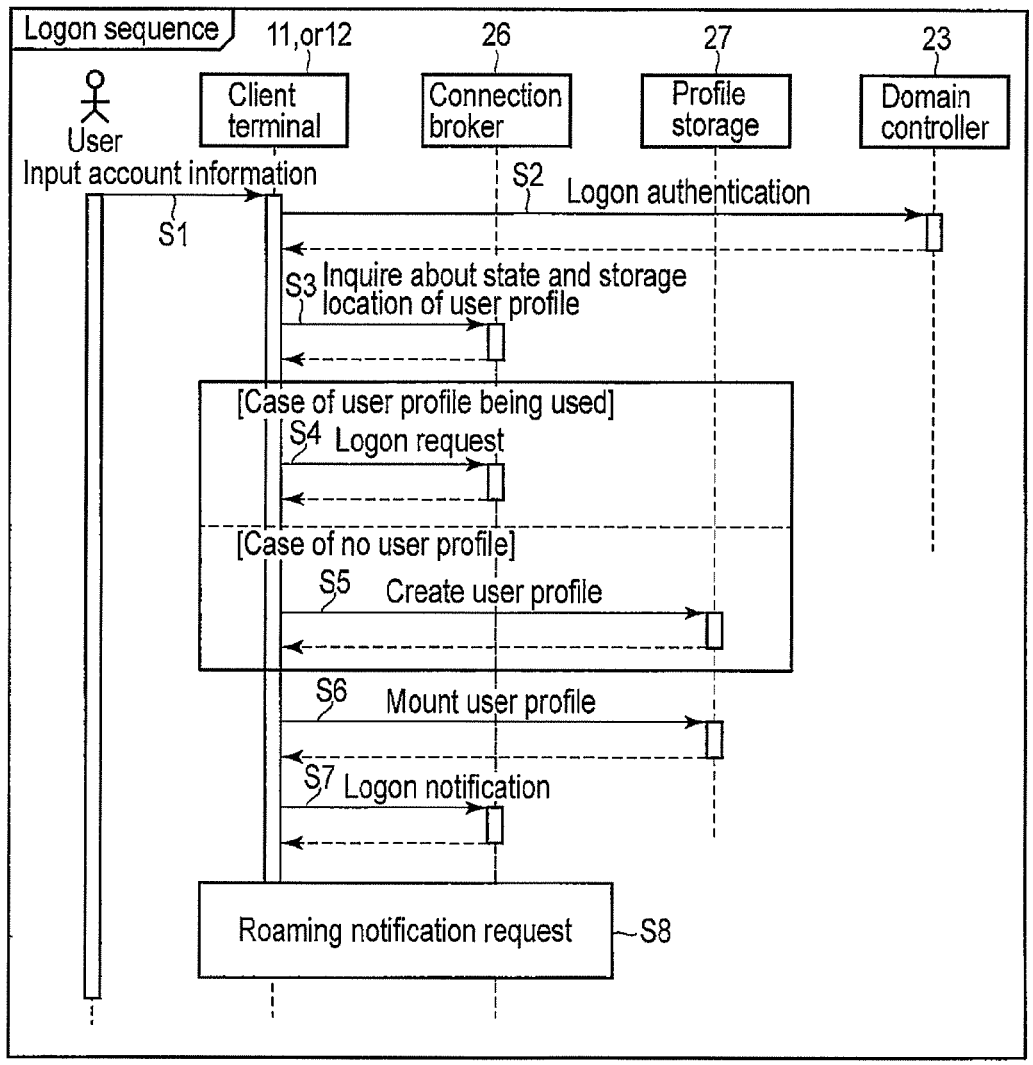
FIG. 11 is an exemplary view illustrating the procedure of a logon process for connecting a client terminal to the client management system of FIG. 1.

FIG. 11 is a sequence chart of a logon process for connecting the client terminal to the system 1.

The user executes a logon operation on the client terminal and inputs user account information (user ID, password, etc.) on the screen of the client terminal (step S1). The client terminal executes logon authentication in cooperation with the domain controller 23 (step S2). If the logon authentication has been successfully carried out, that is, if it is confirmed that the user is a proper user, the agent in the virtual machine corresponding to the client terminal transmits a connection request to the connection broker 26, thereby inquiring of the connection broker 26 about the status and storage location of the user profile (step S3). This inquiry is executed by using a HTTP request. The connection broker 26 returns a response indicative of the status (in-use (true) or non-use (false)) of the user profile and the storage location (storage path) of the user profile, to the agent in the virtual machine corresponding to the client terminal. In the meantime, when the user profile is being used ("true"), the connection broker 26 may return a response indicating that the user profile is being used ("true") to the agent in the virtual machine corresponding to the client terminal. When the user profile is not being used ("false"), the connection broker 26 may return a response indicative of the storage path to the agent in the virtual machine corresponding to the client terminal.

If the user profile is being used, the agent displays the above-described confirmation screen on the display of the client terminal. This confirmation screen may display the ID (machine ID) of the other client terminal which is currently using the user profile. In this case, a message, such as "Is connection to be established, though the system may possibly be connected to another client terminal having machine ID=xxx", is displayed. The information indicative of the machine ID of the client terminal, which is currently using the user profile, may be included in the above-described response.

When the user has selected "connection", the agent transmits a logon request (forcible connection request) to the connection broker 26 (step S4). In addition, when the user first logs on, the user ID of the user is not yet registered in the profile management table (profile table) 703A of the connection broker 26. Thus, the connection broker 26 determines a storage location of the user profile corresponding to the user ID of the user, and returns this storage location as a response. Then, the agent creates a user profile at this storage location in the profile storage 27 (step S5).

If the user profile has already been created and the user profile is not being used, the agent can receive a storage path from the connection broker 26. Then, the agent accesses the storage location of the user profile, and mounts the user profile on the file system of the virtual machine corresponding to the agent (step S6). The agent then transmits to the connection broker 26 logon notification including the user ID and the machine ID of the client terminal, in order to notify the connection broker 26 that the client terminal corresponding to the agent has logged on to the system 1 (step S7). Upon receiving the logon notification, the connection broker 26 accesses the profile table 703A and sets the busy flag of the user profile, which is associated with the user ID included in the logon notification, to be "in-use (true)".

Thereafter, the agent transmits a roaming notification request to the connection broker 26. The roaming notification request is an HTTP request for requesting the connection broker 26 to notify the agent of occurrence of double logon. The content of a process sequence (step S8) relating to the roaming notification request will be described later with reference to FIG. 13 and FIG. 15.

FIG. 12 illustrates a sequence of a logoff process for disconnecting the client terminal from the system 1.

If the user executes a logoff operation on the client terminal (step S11), the agent of this client terminal executes a logoff process for disconnecting the client terminal from the system 1. In this logoff process, the agent unmounts the user profile (step S12). If the client terminal is disconnected ("logoff") from the system 1, the agent transmits logoff notification to the connection broker 26 (step S13). This logoff notification includes the user ID of the user and the machine ID of the client terminal. Upon receiving the logoff notification, the connection broker 26 sets the busy flag in the profile table 703A to be "non-use (false)".

Figure 13:
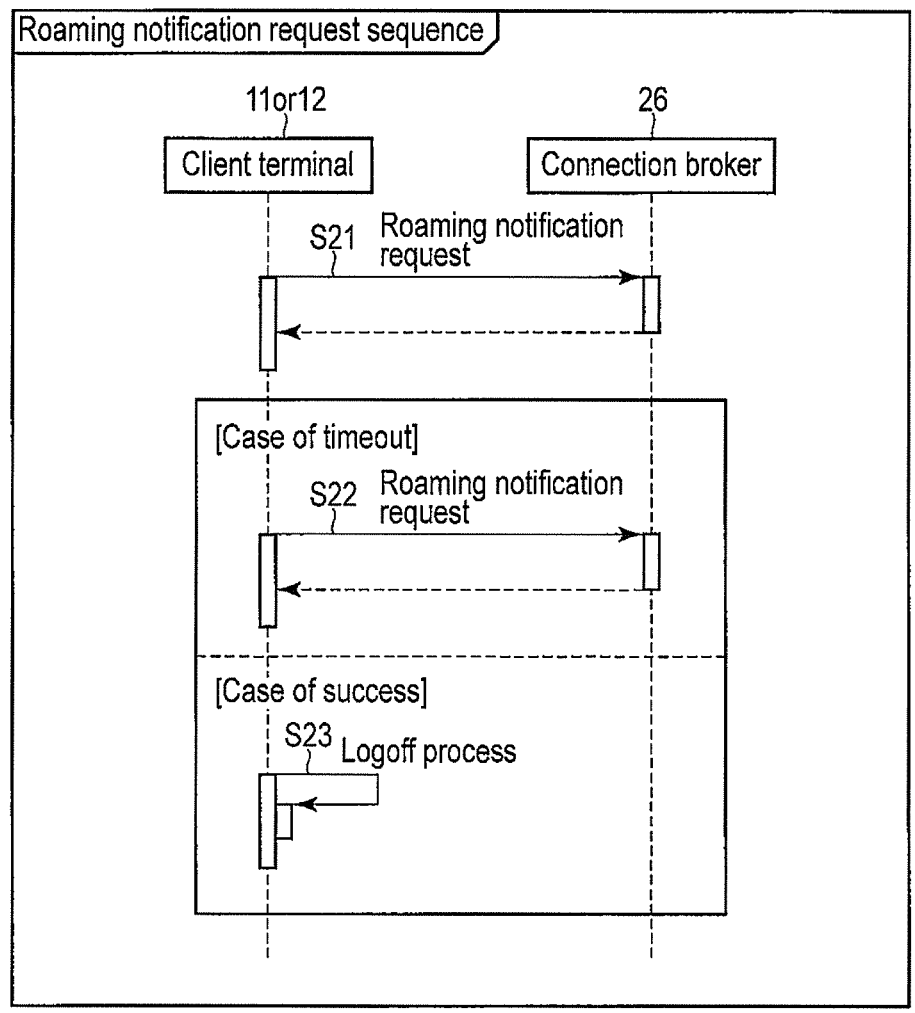
FIG. 13 is an exemplary view illustrating the outline of a process procedure in response to a roaming notification request, which is executed by the information processing apparatus (connection broker) of the embodiment.

FIG. 13 is a sequence chart of a roaming notification request process.

After the client terminal logged on to the system 1, the agent of the client terminal transmits a roaming notification request to the connection broker 26 (step S21). As described above, the roaming notification request is an HTTP request for requesting the connection broker 26 to notify the agent of occurrence of double logon. Upon receiving the roaming notification request, the connection broker 26 determines whether there occurs double logon in which the user, who has already logged on to the system 1, requests new logon to the system 1 by using another client terminal. If no double logon occurs within a predetermined timeout period (e.g. 15 minutes) from the reception of the roaming notification request, the connection broker 26 returns a response indicative of timeout to the agent. The agent transmits once again a roaming notification request to the connection broker 26 (step S22).

If double logon occurs within the predetermined timeout period (e.g. 15 minutes), the connection broker 26 returns a response indicative of the success of the roaming notification request to the agent, in order to instruct the agent of the client terminal, which has transmitted the roaming notification request, to unmount the user profile. Upon receiving the response of the success, the agent executes a logoff process including a process of unmounting the user profile (step S23).

FIG. 14 illustrates an internal sequence of the connection broker 26, which is executed when the logon request (forcible connection request) has been received.

Upon receiving the logon request (forcible connection request) from the agent, the user management module 701A adds a new entry to the roaming table 703B, and stores, in this entry, the logon user ID, the machine ID of the client terminal which is currently using the user profile, and the machine ID (request machine ID) which has transmitted the logon request (step S31). In step S31, if the entry of the same logon user ID is already present in the roaming table 703B, the request machine ID in the entry is changed to the machine ID of the client terminal that has issued the logon request. After adding the entry to the roaming table 703B, the user management module 701A starts a monitor task which is associated with the request machine ID (step S32).

This monitor task periodically repeats, for example, at intervals of 30 seconds, a process of determining whether the user profile, which has been requested by the logon request, has transitioned to "non-use" ("false"), by referring to the profile table 703A. If the user profile has transitioned to "non-use" ("false"), the monitor task, in cooperation with the user management module 701A, returns a response indicative of the storage path of the user profile, to the agent of the client terminal which has transmitted the logon request.

If the user profile has not transitioned to "non-use" ("false") within a predetermined timeout period (e.g. 5 minutes), the user management module 701A transmits "timeout" to the agent of the client terminal which has transmitted the logon request. The agent may transmit once again the logon request to the connection broker 26.

Next, the operation of the monitor task is described.

To start with, the monitor task acquires a list of information in the roaming table 703B (step S33), and determines whether the request machine ID in the added entry has been changed, that is, whether the request machine ID in the added entry is different from the request machine ID which is associated with the monitor task (step S34). If the request machine ID in the added entry is different from the request machine ID which is associated with the monitor task, it is possible that after the monitor task was started, the same user has operated another client terminal and thereby another logon request has been received. When there are a plurality of logon requests from the same user, the last logon request becomes effective. For example, in the case where a certain-user, while logging on to the system 1 by a client terminal (PC1), tries to log on to the system 1 by using another client terminal (PC2), and further tries to log on to the system 1 by using still another client terminal (PC3) ("triple logon"), a higher priority is given to the logon request from the client terminal (PC3) than to the logon request from the client terminal (PC2), and the logon request from the client terminal (PC3) becomes effective. The logon request from the client terminal (PC2) is disabled by a conflict of logon requests.

If the request machine ID in the added entry is different from the request machine ID which is associated with the monitor task, the monitor task transmits to the user management module 701A a message indicating that a conflict of logon requests has occurred (step S35). The user management module 701A sets an internal flag (conflict) indicative of the occurrence of a conflict of logon requests, and returns a response, which indicates that the logon request has failed due to the occurrence of a collision of logon requests, to the agent of the client terminal which has transmitted the logon request (step S36).

If the request machine ID in the added entry agrees with the request machine ID which is associated with the monitor task, the monitor task acquires, from the profile table 703B, information corresponding to the user ID which has requested the logon request (step S37). Then, the monitor task checks the value of the busy flag of the user profile which is associated with the user ID that has issued the logon request, and determines whether this user profile has transitioned to "non-use" ("false") (step S38). If the user profile has transitioned to "non-use", that is, if the busy flag=false, the monitor task requests the service program 702 (or the user management module 701A) to delete the entry added to the roaming table 703B (step S39). Then, the monitor task periodically checks whether this entry has been deleted (step S34). If the deletion of this entry has been confirmed, the monitor task transmits a message indicative of the success of the logon request to the user management module 701A (step S41). The user management module 701A returns a response indicative of the success of the logon request to the agent, thereby notifying the agent of the storage path of the user profile (step S42). If the above-described entry has not been deleted within a certain timeout period since the user profile transitioned to "non-use" ("false"), the monitor task may transmit a message indicative of the failure of the logon request to the user management module 701A (step S43). The user management module 701A may return a response indicative of timeout to the agent of the client terminal which has transmitted the logon request (step S44).

If the user profile has not transitioned to "non-use" ("false") within a predetermined timeout period from the start of the monitor task, the monitor task transmits a message indicative of the failure of the logon request to the user management module 701A (step S45). The user management module 701A returns a response indicative of timeout to the agent of the client terminal which has transmitted the logon request (step S46).

FIG. 15 illustrates an internal sequence of the connection broker 26, which is executed when a roaming notification request has been received.

Upon receiving a roaming notification request from the agent corresponding to the client terminal, the user management module 701A starts the monitor task (step S51). The monitor task periodically repeats, for example, at intervals of 30 seconds, a process of determining whether there has occurred a logon request which has the same user ID as the user ID which has transmitted the roaming notification request, by referring to the roaming table 703B. If there has occurred a logon request which has the same user ID as the user ID which has transmitted the roaming notification request, the monitor task, in cooperation with the user management module 701A, instructs the agent of the client terminal, which has transmitted the roaming notification request, to log off, thereby causing the agent to unmount the user profile.

If there has occurred no logon request within a predetermined timeout period (e.g. 15 minutes), which has the same user ID as the user ID which has transmitted the roaming notification request, the user management module 701A transmits "timeout" to the agent of the client terminal which has transmitted the roaming notification request. The agent may transmit once again the roaming notification request to the connection broker 26.

Next, the operation of the monitor task is described.

The monitor task determines whether the client terminal, which has transmitted the roaming notification request, is already in the logoff state by, e.g. forcible shutdown. Specifically, the monitor task acquires from the profile table 703A the profile information corresponding to the user ID which has transmitted the roaming notification request (step S52), and determines whether the busy flag corresponding to the user ID, which has transmitted the roaming notification request, is "non-use" ("false") (step S53). If the busy flag is "non-use" ("false"), it can be recognized that the client terminal, which has transmitted the roaming notification request, is already logged off. Accordingly, if the busy flag is "non-use" ("false"), the monitor task returns a message indicative of the detection of logoff to the user management module 701A (step S54). Responding to this, the user management module 701A may transmit, for example, a message of a conflict, to the agent as a response to the roaming notification request (step S55).

When the busy flag corresponding to the user ID, which has transmitted the roaming notification request, is "in-use" ("true"), the monitor task executes the following process.

To start with, the monitor task acquires a list of information in the roaming table 703B (step S56), and determines whether an entry of the same user ID as the user ID, which issued the roaming notification request, has been added to the roaming table 703B, that is, whether the user ID, which issued the roaming notification request, agrees with the user ID which issued the logon request (step S57). When the user ID, which issued the roaming notification request, agrees with the user ID which issued the logon request, the monitor task transmits a message ("true") indicative of the success of the roaming notification request, to the user management module 701A (step S58). The user management module 701A returns to the agent a response indicative of the success of the roaming notification request, and instructs the agent to unmount the user profile, that is, to log off from the system 1 (step S59).

If an entry of the same user ID as the user ID, which issued the roaming notification request, has not been added to the roaming table 703B within a predetermined timeout period, the monitor task transmits a message indicative of the failure of the roaming notification request to the user management module 701A (step S60A). The user management module 701A returns a response indicative of timeout to the agent of the client terminal which has transmitted the roaming notification request (step S60B).

As has been described above, in the present embodiment, the request of the HTTP (roaming notification request, logon request) is retained on the connection broker 26 side, and a response is returned to the agent at a proper timing. Therefore, in the case where the user has moved, without logging off from a client terminal that is in-use (a client terminal at the starting point of movement), to another client terminal (a client terminal at the destination of movement), and has executed a logon operation on the client terminal at the destination of movement, the client terminal at the starting point of movement can be automatically logged off from the system 1, and the user profile can be mounted on the client terminal at the destination of movement after the client terminal at the starting point of movement is logged off from the system 1.

FIG. 16 illustrates an internal sequence of the service program 702 of the connection broker 26. In order to cause the agent in the virtual machine corresponding to the client terminal, which is using the user profile requested by the logon request, to unmount the user profile, the service program 702 stores a notification file, which indicates that the user profile is requested by another client terminal, in a folder on the user profile storage 27 in which the user profile is present. Even if a problem occurs with the communication (communication using the HTTP protocol) between the agent and the connection broker 26, the notification file can cause the agent of the client terminal, which is using the user profile requested by the logon request, to unmount the user profile.

Further, the service program 702 accesses the user profile storage 27 and determines whether a virtual image file (Userprofile.vhd) of the user profile, which has been requested by the logon request, can be opened or not. If the user profile is being used, the user profile cannot be opened. Thus, if the user profile has successfully been opened, it can be determined that the user profile was unmounted. Thereby, even when a problem has occurred with the communication between the agent and the connection broker 26, it can correctly be determined whether the user profile requested by the logon request has been unmounted or not.

If the OS of the connection broker 26 has been started, the service program 702 is automatically started by the OS (step S61). When the service program 702 has been started, the service program 702 starts a worker thread (step S62). The worker thread repeatedly executes at regular intervals (e.g. at intervals of 30 s) a timer thread for monitoring the user profile status (step S63).

The timer thread acquires information of each entry of the roaming table 703B (step S64) and, if a logon request is present, the timer thread creates the above-described notification file in the folder in the user profile storage 27 (step S65). For example, when the user profile, which is associated with the user ID that has issued the logon request, is "UserProfile.vhd" in FIG. 6, the notification file is stored in the folder (user ID1\) in the user profile storage 27. As the file name of the notification file, use may be made of the machine ID of the client terminal at the starting point of movement, that is, the machine ID of the client terminal which is currently using the user profile (UserProfile1.vhd) that has been requested by the logon request. Thereby, the agent of the client terminal, which is currently using the user profile (UserProfile1.vhd), can be correctly notified that the user profile (UserProfile1.vhd), which is being currently used by the own terminal, is requested by another client terminal. In addition, as the file name, use may be made of the machine ID of the client terminal that is currently using the user profile (UserProfile1.vhd), the domain name and the computer name. In this case, the file name may be "(machine ID).(domain name).(computer name)".

The timer thread tries to open the user profile which is associated with the user ID which has issued the logon request, and determines whether this user profile is being used, according to whether the user profile can be opened or not (step S66). If the agent of the client terminal that is using the user profile unmounts this user profile, this user profile can be opened.

When the user profile has successfully been opened, the timer thread deletes the notification file in the folder in which the user file that was successfully opened is present (step S67). Then, the timer thread deletes the entry in the roaming table 703B, which corresponds to the user file that was successfully opened (step S68). Further, the timer thread executes a process of setting the busy flag in the profile table 703A, which corresponds to the user file that was successfully opened, to be "non-use" ("false") (step S69).

FIG. 17 illustrates four double-logon scenario patterns to which the user profile management process of the connection broker 26 is applied. In each of the scenario patterns, the case is assumed that in the state in which the user (User1) logs on to the system 1 by using the client terminal (PC1), the user (User1) tries to log on to the system 1 by using another client terminal (PC2). Next, processes in the respective patterns are described.

FIG. 18 illustrates the operation of the connection broker 26 in the case of double logon scenario pattern 1.

(1) A user (User1) executes a logon operation on a PC1. A virtual machine (agent) corresponding to the PC1 transmits a connection request to the connection broker 26. The connection broker 26 notifies the virtual machine corresponding to the PC1 of the storage path indicative of a first storage location in the profile storage 27 in which a user profile associated with the user (User1) is stored, and causes the virtual machine corresponding to the PC1 to mount the user profile, that is, the first storage location in the profile storage 27, on the file system of the virtual machine.

(2) The virtual machine corresponding to the PC1 transmits logon notification to the connection broker 26. The connection broker 26 sets the status of the busy flag, which corresponds to the user profile associated with the user (User1), to be "in-use".

(3) The virtual machine corresponding to the PC1 transmits a roaming notification request to the connection broker 26.

(4) The user (User1) moves to a PC2 in the state in which the PC1 is being logged on to the system 1. Then, the user (User1) executes a logon operation on the PC2.

(5) A virtual machine (agent) corresponding to the PC2 transmits a connection request to the connection broker 26. The connection broker 26 determines whether the user profile associated with the user (User1) is being used by another client terminal. In this case, since the user profile associated with the user (User1) is being used by the PC1, the connection broker 26 returns a response, which indicates that the user profile is being used, to the virtual machine corresponding to the PC2, and causes the virtual machine corresponding to the PC2 to display the above-described confirmation screen on the display of the PC2.

(6) If the user (User1) selects "YES" on the confirmation screen, the virtual machine corresponding to the PC2 transmits a logon request (forcible connection request), which is indicative of the execution of connection, to the connection broker 26. The connection broker 26 adds an entry to the roaming table 7036. In the added entry, information, such as user ID=User1, machine ID=PC1, and request machine ID=PC2, is stored.

(7) The connection broker 26 returns a response to the roaming notification request to the PC1, and instructs the virtual machine corresponding to the PC1 to unmount the user file associated with the user (User1).

(8) The virtual machine corresponding to the PC1 starts a logoff process, and unmounts the user profile associated with the user (User1), that is, the first storage location in the profile storage 27.

(9) If the logoff process has been completed, that is, if the first storage location in the profile storage 27 has been unmounted, the virtual machine corresponding to the PC1 transmits logoff notification to the connection broker 26. When the logoff notification has been received, the connection broker 26 sets the status of the busy flag, which corresponds to the user profile associated with the user (User1), to be "non-use" ("false"). In addition, in the connection broker 26, the above-described service program 702 operates on the background. If the service program 702 detects addition of an entry of User1 to the roaming table 703B, the service program 702 creates a notification file, and checks whether the user profile of User1 can be opened or not. If it has been confirmed that the user profile can be opened, the service program 702 deletes the entry of User1 in the roaming table 703B, and sets the status of the busy flag, which corresponds to the user profile of User1, to be "non-use" ("false").

(10) If the status of the busy flag, which corresponds to the user profile of User1, has been set to be "non-use" ("false"), the connection broker 26 notifies the virtual machine corresponding to the PC2 of the storage path indicative of the first storage location in the profile storage 27 in which the user profile is stored, and causes the virtual machine corresponding to the PC2 to mount the user profile, that is, the first storage location in the profile storage 27, on the file system of the virtual machine.

FIG. 19 illustrates the operation of the connection broker 26 in the case of double logon scenario pattern 2.

The process of (1) to (7) is the same as in the case of scenario pattern 1. In scenario pattern 2, the case is assumed that the communication between the PC1 and the profile storage 27 has been disconnected due to a problem. In this case, it is possible that the virtual machine corresponding to the PC1 cannot normally execute the logoff process. However, when the communication between the PC1 and the profile storage 27 has been disconnected due to a problem, the user profile of User1 can be opened. If the service program 702 has confirmed that the user profile of User1 can be opened, the service program 702 deletes the entry of User1 in the roaming table 703B, and sets the status of the busy flag, which corresponds to the user profile of User1, to be "non-use" ("false").

Thus, even if the communication between the PC1 and the profile storage 27 has been disconnected due to a problem, the status of the busy flag, which corresponds to the user profile of User1, can be set to be "non-use" ("false"). Therefore, the connection broker 26 can notify the virtual machine corresponding to the PC2 of the storage path indicative of the first storage location in the profile storage 27 in which the user profile associated with the user (User1) is stored ((10)).

FIG. 20 illustrates the operation of the connection broker 26 in the case of double logon scenario pattern 3.

The process of (1) to (6) is the same as in the case of scenario pattern 1. In scenario pattern 3, the case is assumed that after the process of (6), the communication between the PC1 and the connection broker 26 has been disconnected due to a problem. In this case, it is possible that a response to a roaming notification request cannot be transmitted from the connection broker 26 to the PC1. The service program 702 creates a notification file, and stores the notification file in the folder in the profile storage 27, in which the first storage location is present. In addition, if the virtual machine (the agent in the virtual machine) corresponding to the PC1 detects disconnection between the connection broker 26 and the virtual machine, the virtual machine periodically monitors whether or not a notification has been created in the folder in the profile storage 27. For example, the virtual machine determines whether a notification file including the machine ID of the PC1 as the file name is present in the folder. If the notification file is present, the virtual machine starts the logoff process, and unmounts the user profile associated with the user (User1), that is, the first storage location in the profile storage 27 ((8)). The service program 702 checks whether the user profile of User1 can be opened. If it has been confirmed that the user profile can be opened, the service program 702 deletes the entry of User1 in the roaming table 703B, and sets the status of the busy flag, which corresponds to the user profile of User1, to be "non-use" ("false").

Thus, even in the case where the response to the roaming notification request cannot be transmitted due to a problem with the communication between the PC1 and the connection broker 26, the PC1 can be made to unmount the user profile of User1. In addition, the status of the busy flag, which corresponds to the user profile of User1, can be set to be "non-use" ("false"). Therefore, the connection broker 26 can notify the virtual machine corresponding to the PC2 of the storage path indicative of the first storage location in the profile storage 27 in which the user profile associated with the user (User1) is stored ((10)).

FIG. 21 illustrates the operation of the connection broker 26 in the case of double logon scenario pattern 4.

The process of (1) to (6) is the same as in the case of scenario pattern 1. In scenario pattern 4, the case is assumed that after the process of (6), the communication between the PC1 and the connection broker 26 has been disconnected due to a problem. In scenario pattern 4, the case is also assumed that the communication between the PC1 and the profile storage 27 has been disconnected due to a problem. In this case, it is possible that the virtual machine corresponding to PC1 cannot detect a notification file. However, when the communication between the PC1 and the profile storage 27 has been disconnected due to a problem, the user profile of User1 can be opened. If the service program 702 has confirmed that the user profile of User1 can be opened, the service program 702 deletes the entry of User1 in the roaming table 703B, and sets the status of the busy flag, which corresponds to the user profile of User1, to be "non-use" ("false").

Thus, the connection broker 26 can notify the virtual machine corresponding to the PC2 of the storage path indicative of the first storage location in the profile storage 27 in which the user profile associated with the user (User1) is stored ((10)).

In the above-description, the case has been described that the logon request is transmitted to the connection broker 26 when the user has selected "YES" on the confirmation screen of the client terminal at the destination of movement of the user. Alternatively, at the time of receiving a connection request which is transmitted to the connection broker 26 in response to the logon operation on the client terminal by the user at the destination of movement, the virtual machine of the client terminal at the starting point of movement can be made to unmount the user profile.

As has been described above, according to the present embodiment, in response to a connection request from a first virtual machine corresponding to a first client terminal on which a first user has executed a logon operation, the information indicative of a path to a first storage location is transmitted to the first virtual machine corresponding to the first client terminal, so that the first storage location in the profile storage 27 on the network, which stores a first user profile associated with an identifier of the first user, may be mounted on the file system of the first virtual machine corresponding to the first client terminal. Then, in response to a connection request from a second virtual machine corresponding to a second client terminal on which the first user has newly executed a logon operation, it is determined whether the first user profile is being used by the first client terminal. When the first user profile is being used, a process is executed for causing the first virtual machine corresponding to the first client terminal to unmount the first storage location. Then, the information indicative of a path to the first storage location is transmitted to the second virtual machine corresponding to the second client terminal, so that the first storage location may be mounted on the file system of the second virtual machine corresponding to the second client terminal.

Thus, in the case where the user has executed the logon operation on the second client terminal, while logging on to the system by using the first client terminal, the first client terminal can automatically be caused to unmount the first user profile. Therefore, even when the user operates any one of client terminals, the user can use the same user environment.

For example, even when the user has moved to a meeting room or a public space, while logging on to the system 1 by using the client terminal on his/her own desk, the user can log on to the system 1 by operating a client terminal in the meeting room or public space. Furthermore, even on the client terminal in the meeting room or public space, the user can use the same user environment as with the client terminal on his/her own desk.

All the procedures of the processes of the present embodiment can be realized by software. Thus, the same advantageous effects as with the present embodiment can easily be obtained simply by installing a computer program, which executes the procedures of the processes of the embodiment, into a computer such as a server computer through a computer-readable storage medium which stores the computer program, and executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information process apparatus which is applied to a client management system configured to manage a plurality of virtualization client terminals and a plurality of thin client terminals on a network, the thin client terminals each configured to communicate with a virtual machine in the client management system by using a screen transfer protocol, the virtualization client terminals each configured to execute virtualization software, an operating system and an application program in a virtual image file which is delivered from the client management system, the apparatus comprising:

a storage module configured to store (i) an identifier of a user, (ii) an identifier of a user profile corresponding to the user, (iii) a flag that indicates whether the user profile is being used, and (iv) information indicative of a path to a storage location of the user profile;

a first control module configured to transmit, in response to receiving a connection request including an identifier of a first user from a first virtual machine corresponding to a first client terminal which is one of the plurality of thin client terminals or the plurality of virtualization client terminals and on which the first user has executed a logon operation, information indicative of a path to a first storage location in a storage on the network to the first virtual machine such that the first storage location is mounted on a file system of the first virtual machine, the first storage location storing a first user profile associated with the identifier of the first user, wherein the first control module, upon receiving a logon notification including the identifier of the first user from the first virtual machine, accesses the storage module and sets a flag of the first user profile to be a first state; and a second control module configured to determine, in response to receiving a connection request from a second virtual machine corresponding to a second client terminal which is one of the plurality of thin client terminals or the plurality of virtualization client terminals and on which the first user has newly executed a logon operation, whether the first user profile is being used by the first client terminal, to cause, if the first user profile is being used, the first virtual machine to unmount the first storage location, and to transmit the information indicative of the path to the first storage location to the second virtual machine such that the first storage location is mounted on a file system of the second virtual machine, wherein the second control module, upon receiving a logoff notification including the identifier of the first user from the first virtual machine, accesses the storage module and sets the flag of the first user profile to be a second state different than the first state.

2. The information processing apparatus of claim 1, wherein the second control module is further configured to cause, if the first user profile is being used, the second virtual machine to display on a display of the second client terminal a screen for confirming whether or not to establish a connection of the second client terminal to the system, and to cause, if a request indicative of execution of the connection has been received from the second virtual machine, the first virtual machine to unmount the first storage location.

3. The information processing apparatus of claim 1, wherein the second control module is configured to instruct the first virtual machine to execute a logoff process for disconnecting the first client terminal from the system, thereby to cause the first virtual machine to unmount the first storage location.

4. The information processing apparatus of claim 1, wherein the second control module is configured to store a notification file, which indicates that the first user profile is being requested by another client terminal, in a folder on the storage, in which the first storage location is present, thereby to cause the first virtual machine to unmount the first storage location.

5. The information processing apparatus of claim 1, wherein the first client terminal is one of the plurality of thin client terminals.

6. A client management system configured to manage a plurality of virtualization client terminals and a plurality of thin client terminals on a network, the thin client terminals each configured to communicate with a virtual machine in the client management system by using a screen transfer protocol, the virtualization client terminals each configured to execute virtualization software, an operating system and an application program in a virtual image file which is delivered from the client management system, the apparatus comprising:

a storage module configured to store (i) an identifier of a user, (ii) an identifier of a user profile corresponding to the user, (iii) a flag that indicates whether the user profile is being used, and (iv) information indicative of a path to a storage location of the user profile;

a thin client execution server configured to execute a plurality of virtual machines for communicating with a plurality of thin client terminals on the network by using a screen transfer protocol;

a delivery server configured to deliver a virtual image file including an operating system and an application program to a plurality of virtualization client terminals on the network, which execute virtualization software; and a profile management module configured to manage a plurality of user profiles corresponding to a plurality of users by using a storage which stores the plurality of user profiles, the profile management module comprising:

a first control module configured to transmit, in response to receiving a connection request including an identifier of a first user from a first virtual machine corresponding to a first client terminal which is one of the plurality of thin client terminals or the plurality of virtualization client terminals and on which the first user has executed a logon operation, information indicative of a path to a first storage location in a storage on the network to the first virtual machine such that the first storage location is mounted on a file system of the first virtual machine, the first storage location storing a first user profile associated with the identifier of the first user, wherein the first control module, upon receiving a logon notification including the identifier of the first user from the first virtual machine, accesses the storage module and sets a flag of the first user profile to be a first state; and a second control module configured to determine, in response to receiving a connection request from a second virtual machine corresponding to a second client terminal which is one of the plurality of thin client terminals or the plurality of virtualization client terminals and on which the first user has newly executed a logon operation, whether the first user profile is being used by the first client terminal, to cause, if the first user profile is being used, the first virtual machine to unmount the first storage location, and to transmit the information indicative of the path to the first storage location to the second virtual machine such that the first storage location is mounted on a file system of the second virtual machine, wherein the second control module, upon receiving a logoff notification including the identifier of the first user from the first virtual machine, accesses the storage module and sets the flag of the first user profile to be a second state different than the first state.

7. The client management system of claim 6, wherein the second control module is further configured to cause, if the first user profile is being used, the second virtual machine to display on a display of the second client terminal a screen for confirming whether or not to establish a connection of the second client terminal to the system, and to cause, if a request indicative of execution of the connection has been received from the second virtual machine, the first virtual machine to unmount the first storage location.

8. The client management system of claim 6, wherein the first client terminal is one of the plurality of thin client terminals.

9. A client management method of managing a plurality of virtualization client terminals and a plurality of thin client terminals on a network, the thin client terminals each configured to communicate with a virtual machine in the client management system by using a screen transfer protocol, the virtualization client terminals each configured to execute virtualization software, an operating system and an application program in a virtual image file which is delivered from the client management system, the method comprising:

storing, in a storage module, (i) an identifier of a user, (ii) an identifier of a user profile corresponding to the user, (iii) a flag that indicates whether the user profile is being used, and (iv) information indicative of a path to a storage location of the user profile;

transmitting, in response to receiving a connection request including an identifier of a first user from a first virtual machine corresponding to a first client terminal which is one of the plurality of thin client terminals or the plurality of virtualization client terminals and on which the first user has executed a logon operation, information indicative of a path to a first storage location in a storage on the network to the first virtual machine, such that the first storage location is mounted on a file system of the first virtual machine, the first storage location storing a first user profile associated with the identifier of the first user, wherein the first control module, upon receiving a logon notification including the identifier of the first user from the first virtual machine, accesses the storage module and sets a flag of the first user profile to be a first state;

determining, in response to receiving a connection request from a second virtual machine corresponding to a second client terminal which is one of the plurality of thin client terminals or the plurality of virtualization client terminals and on which the first user has newly executed a logon operation, whether the first user profile is being used by the first client terminal; and causing, if the first user profile is being used, the first virtual machine to un mount the first storage location, and transmitting the information indicative of the path to the first storage location to the second virtual machine such that the first storage location is mounted on a file system of the second virtual machine, wherein the second control module, upon receiving a logoff notification including the identifier of the first user from the first virtual machine, accesses the storage module and sets the flag of the first user profile to be a second state different than the first state.

10. The client management method of claim 9, further comprising causing, if the first user profile is being used, the second virtual machine to display on a display of the second client terminal a screen for confirming whether or not to establish a connection of the second client terminal to the system, wherein said causing the first virtual machine to unmount the first storage location includes causing, if a request indicative of execution of the connection has been received from the second virtual machine, the first virtual machine to unmount the first storage location.

11. The client management method of claim 9, wherein the first client terminal is one of the plurality of thin client terminals.

* * * * *